(12) United States Patent
Ono

(10) Patent No.: US 9,737,940 B2
(45) Date of Patent: Aug. 22, 2017

(54) CIRCULAR SAW CUTTING MACHINE WITH AUTOMATED WORK-PIECE REMAINDER CUTTING

(75) Inventor: Mitsuo Ono, Toyohashi (JP)

(73) Assignee: NISHIJIMA KABUSHIKI KAISHA, Aichi (JP)

( * ) Notice: Subject to any disclaimer, the term of this patent is extended or adjusted under 35 U.S.C. 154(b) by 1113 days.

(21) Appl. No.: 13/575,578

(22) PCT Filed: Jun. 24, 2010

(86) PCT No.: PCT/JP2010/060768
§ 371 (c)(1),
(2), (4) Date: Jul. 26, 2012

(87) PCT Pub. No.: WO2011/099176
PCT Pub. Date: Aug. 18, 2011

(65) Prior Publication Data
US 2012/0297949 A1    Nov. 29, 2012

(30) Foreign Application Priority Data
Feb. 10, 2010 (JP) .................................. 2010-027607

(51) Int. Cl.
*B23D 47/04* (2006.01)

(52) U.S. Cl.
CPC ............. *B23D 47/04* (2013.01); *Y10T 83/263* (2015.04); *Y10T 83/4458* (2015.04)

(58) Field of Classification Search
CPC .... B23D 47/04; B23D 47/042; B23D 47/045; B23D 47/06; B23D 47/065; Y10T 83/4458; Y10T 83/263

USPC .................. 83/206, 277, 151, 153, 209, 169
See application file for complete search history.

(56) References Cited

U.S. PATENT DOCUMENTS

| | | | | |
|---|---|---|---|---|
| 4,676,557 A | * | 6/1987 | Shope et al. ................. | 299/39.3 |
| 4,866,630 A | * | 9/1989 | Beaman et al. .............. | 700/160 |
| 5,060,547 A | * | 10/1991 | Moriya et al. ................. | 83/210 |

(Continued)

FOREIGN PATENT DOCUMENTS

| EP | 1 764 177 | 3/2007 |
|---|---|---|
| JP | 61-078523 | 5/1986 |

(Continued)

*Primary Examiner* — Stephen Choi
*Assistant Examiner* — Fernando Ayala
(74) *Attorney, Agent, or Firm* — Norris McLaughlin & Marcus, P.A.

(57) ABSTRACT

In a circular cutting machine, a main vice unit includes a stationary rear vice and a front vice disposed to be movable back and forth in a range between a position forward of a preset cutting position and a rearmost position where the rear ends of jaws come into contact with the front ends of jaws of the rear vice. The rear and front vices include clamping cylinders that are independently controllable so as to independently clamp and unclamp their respective vices. When photoelectric sensors detect the rear end of work, the remaining length is calculated, which is then divided by the fixed-length feed amount to calculate a remaining number of possible cutting operations. The remaining number of such operations are carried out by using either a combination of the front vice and a transfer vice unit or the front vice alone to pull out the work.

4 Claims, 23 Drawing Sheets

(56) References Cited

U.S. PATENT DOCUMENTS

| | | | |
|---|---|---|---|
| 5,315,906 A * | 5/1994 | Ferenczi | B23D 45/024 83/151 |
| 5,755,147 A * | 5/1998 | Tsune | 83/277 |
| 5,823,081 A | 10/1998 | Tsune | |
| 5,878,641 A * | 3/1999 | Tsune | 83/277 |
| 6,460,440 B1 * | 10/2002 | Tsune | 83/153 |
| 6,941,864 B2 * | 9/2005 | Dick et al. | 101/483 |
| 2004/0069106 A1 * | 4/2004 | McAdoo | 83/34 |
| 2004/0163516 A1 * | 8/2004 | Irwin | 83/205 |
| 2005/0076759 A1 * | 4/2005 | Westfall et al. | 83/47 |
| 2007/0028730 A1 * | 2/2007 | Sawyer et al. | 83/13 |
| 2009/0266211 A1 * | 10/2009 | Westfall et al. | 83/208 |

FOREIGN PATENT DOCUMENTS

| | | | |
|---|---|---|---|
| JP | 1-140914 | 6/1989 | |
| JP | 0788836 A * | 4/1995 | B28D 5/02 |
| JP | 8-019915 | 1/1996 | |
| JP | 8-025136 | 1/1996 | |
| JP | 9-011033 | 1/1997 | |
| JP | 2000-042830 | 2/2000 | |
| JP | 2001-087942 | 4/2001 | |
| JP | 2001-293615 | 10/2001 | |
| JP | 2002-079419 | 3/2002 | |
| JP | 2002-370124 | 12/2002 | |
| JP | 2008-238359 | 10/2008 | |
| JP | 2008-254148 | 10/2008 | |
| JP | 4392459 | 10/2009 | |
| JP | 4563507 | 8/2010 | |

* cited by examiner

CIRCULAR SAW CUTTING MACHINE WITH AUTOMATED WORK-PIECE REMAINDER CUTTING

BACKGROUND OF THE INVENTION

The present invention relates to technology to reduce the amount of work remainder when performing fixed-length cutting of work with a circular cutting machine.

As shown in FIG. 23, conventionally, a cutting machine comprises a main vise mechanism 1 for gripping work W upstream of and downstream of a cutting position P, and a work feed vise mechanism 4 for gripping the work W and feeding it to the cutting position P, and successively cuts the work W as the work feed vise mechanism 4 feeds it a predetermined cutting length L at a time. It has been proposed to provide in this circular cutting machine a work withdrawal mechanism 10 for gripping the top end of the remainder Wr to withdraw it in the work feed direction by a given length α=L−(Lr−Lmin) when the difference between the length Lr of the work remainder Wr and the feed limit length Lmin of the work remainder Wr by the work feed vise mechanism 4 becomes smaller than the cutting length L of the work W (i.e., L>Lr−Lmin) (Japanese Published Unexamined Patent Application No. 2001-293615 (the Abstract and FIGS. 1-4)).

SUMMARY OF THE INVENTION

According to the apparatus of the aforementioned prior art, after cutting is performed using the work feed vice mechanism 4 and the work withdrawal mechanism 10 as shown in FIGS. 23(A)-(D), the work remainder Wr can be neither fed nor gripped as shown in FIG. 23(E). Accordingly, once the work feed vice mechanism 4 is no longer capable of feeding work, the prior art apparatus can perform "only one more" cutting operation.

One object of the present invention is to enable further cutting with a circular cutting machine while maintaining cutting accuracy even after feeding is no longer possible.

A circular cutting machine according to the present invention made to achieve the foregoing object comprises: a headstock transfer unit for transferring a headstock between a standby position and a cutting position, the headstock mounting a circular saw motor for rotatably driving a circular saw blade; a transfer vice unit for feeding a work by advancing toward the cutting position; a main vice unit for clamping the work at prescribed positions forward and rear of and across the cutting position; and a fixed-length cutting controller for drivably controlling the circular saw motor, the headstock transfer unit, the transfer vice unit, and the main vice unit to perform fixed-length cutting of the work; the circular cutting machine being characterized by further comprising the following features:

(1) the main vice unit comprising a rear vice fixed in forward and rearward directions in a prescribed position rear of the cutting position and a front vice having, as its preset position during cutting, a prescribed position forward of and across the cutting position from the rear vice, the front vice being movably disposed in the forward and rearward directions in a range between a position forward of its preset position and a rearmost position where rear ends of jaws of the front vice are in contact with front ends of jaws of the rear vice, the front vice and the rear vice including separate clamping cylinders capable of being independently controllable to perform clamping and unclamping independently;

(2) work end detection sensors for detecting an rear end of the work; and (3) the fixed-length cutting controller being configured to perform control process to implement the following:

(3A) a fixed-length cutting process for cutting the work to a fixed-length by repeating the control process of: causing the transfer vice unit to clamp the work at a standby position and advance a fixed-length feed amount from the standby position with the front vice and the rear vice remaining unclamped; after the advance is completed, causing the front vice and the rear vice to clamp the work in their respective prescribed positions forward and rear of a cutting line; driving the circular saw motor and the headstock transfer unit to cut the work; after the cutting of the work is completed, causing the transfer vice unit, returned to its standby position, to clamp the work; causing the front vice and the rear vice to unclamp the work; after causing the transfer vice unit to advance the fixed-length feed amount from the standby position with the work clamped by the transfer vice unit, causing the front vice and the rear vice to clamp the work in their respective prescribed positions forward and rear of the cutting line; and driving the circular saw motor and the headstock transfer unit to cut the work;

(3B) a determination process for calculating a remaining length of the work currently undergoing fixed-length cutting based on detection signals from the work end detection sensors and determining whether or not the remaining length has become insufficient to permit the transfer vice unit to advance the work the fixed-length feed amount;

(3C) a work pullout process for, if the determination process determines that the remaining length of the work has become insufficient to permit the transfer vice unit to advance the work the fixed-length feed amount, causing the front vice to retract to the rearmost position while remaining unclamped from the work, and then causing the front vice alone to clamp and advance the work a predetermined pullout amount so as to position the work, which can no longer be fed the fixed length, forward of the cutting line the length equivalent to the fixed-length feed amount; and (3D) a work remainder cutting process for, after the work pullout process is actuated to cause the front vice to pull out the work, causing the rear vice to clamp the work and the front vice to unclamp the work and retract; causing the front vice to stop at the prescribed position forward of the cutting position and then clamp the work again; and driving the circular saw motor and the headstock transfer unit to cut the work, which is clamped by the front vice and the rear vice in the prescribed positions forward and rear of the cutting position so as to further cut the work remainder, which can no longer be transferred the fixed-length feed amount by the transfer vice unit.

According to the circular cutting machine of the present invention, the main vice is capable of clamping work with the front vice and the rear vice at the prescribed positions forward and rear of the cutting position. This allows the circular saw to cut the work with the two ends thereof being supported so as to sufficiently suppressing the vibration of the work. Accordingly, this realizes fixed-length cutting with high accuracy. Furthermore, the front vice is adapted to be movable back and forth and the front vice and the rear vice are capable of clamping and unclamping independently. As a result, the work pullout process can keep the work clamped by the positionally fixed rear vice while causing the front vice retract to the rearmost position, in which the jaws of the front and rear vices are brought into contact with each other. This enables the front vice to pull out the work even when the transfer vice unit is no longer capable of clamping the work. Furthermore, while the front vice clamps the work as it is retracted to its rearmost position, the rear vice may be caused to unclamp the work. This in turn allows only the front vice to clamp and move the work forward. In this way, forward and rearward movement of the front vice provides for fixed-length feed even after the transfer unit is no longer capable of fixed-length feed. Whether or not the foregoing work pullout is to be performed by the front vice is determined based on the remaining length of the work currently undergoing fixed-length cutting, with the remaining length calculated based on detection signals by the work end detection sensors. This results in accurate determination of when the fixed-length feeding by the transfer vice unit should be switched over to the work pullout by the front vice.

The circular cutting machine of the present invention may further comprise one or both of the following features (3E) and (3F):

(3E) the work pullout process being configured to advance the front vice from the rearmost position the fixed-length feed amount with the work clamped by the front vice;

(3F) the work pullout process being configured to: cause the transfer vice unit to clamp the work after moving forward of the standby position and move to a forward end from that clamping position; cause the transfer vice unit, currently in the forward end, to pass the work to the main vice unit while the transfer vice unit is clamping the work by causing the rear vice of the main vice unit to clamp the work; cause the front vice to unclamp the work and retract to the rearmost position; and then cause the front vice alone to clamp the work in the rearmost position and advance the work the distance equivalent to the fixed-length feed amount minus the foregoing forward movement of the transfer vice unit so as to carry out the pullout of the work.

The circular cutting machine further comprising the feature (3E) is of a type that, when it becomes difficult for the transfer vice unit to carry out fixed-length feed, relies only on pullout of the work by the front vice to carry out the subsequent fixed-length feed.

The circular cutting machine further comprising the feature (3F) is of a type that, when it becomes difficult for the transfer vice unit to carry out fixed-length feed, uses the transfer vice unit to perform as much feeding as possible and uses the front vice to pull out the rest.

The circular cutting machine comprising both features (3E) and (3F) is of a type that, when it becomes difficult for the transfer vice unit to carry out fixed-length feed, uses the transfer vice unit to perform as much feeding as possible and uses the front vice to feed the rest, and when it later becomes difficult for the transfer vice unit to perform fixed-length feed, relies only on pullout of the work by the front vice to carry out the subsequent fixed-length feed.

In other words, this is of a type that makes a switchover of the work feeding after fixed-length feeding becomes difficult.

The circular cutting machine of the present invention may further comprise the following features (4) and (3G):

(4) air nozzles provided in proximity to a cutting edge of the circular saw blade mounted on the circular saw motor, the air nozzles for discharging compressed air in the direction feeding the work; and (3G) the fixed-length cutting controller being further configured to perform control process to implement a saw-blade return control process for causing the transfer vice unit to clamp and slightly retract the work when the headstock transfer unit retracts the circular saw motor from the cutting position to the standby position until the determination process determines that the remaining length of the work has become insufficient to permit the transfer vice unit to advance the work the fixed-length feed amount, and after the determination process determines that the remaining length of the work has become insufficient to permit the transfer vice unit to advance the work the fixed-length feed amount, the saw-blade return control process causing the circular saw motor to start retraction after causing compressed air to be discharged from the air nozzles when the headstock transfer unit retracts the circular saw motor from the cutting position to the standby position, the saw-blade return control process continuing to cause compressed air to be discharged from the air nozzles at least until after the cutting edge of the circular saw blade clears the cut surface of the work toward the standby position.

Due to the further features (4) and (3G), in the cutting operation after the transfer vice unit is no longer capable of fixed-length feeding, compressed air is discharged from the air nozzles when the circular saw motor headstock is returned to the standby position. The direction of discharge is the same as the direction in which the work is fed and discharge occurs in proximity to the cutting edge of the circular saw blade. Accordingly, this slightly bends the entire circular saw blade in such a manner as to turn the cutting edge away from the remaining work. This prevents the cutting edge of the circular saw blade from coming into contact with the cut surface of the work when the circular saw motor is returned to the standby position. This feature is particularly effective when the present invention is applied to a circular cutting machine using a circular saw blade, such as a carbide tipped saw blade, whose cutting edge protrudes from the disk portion of the saw blade in the forward and rearward directions (along the thickness). While the transfer vice unit is capable of transfer work freely, it may retract the work when the circular saw motor is returned to the standby position. Once the work needs to be transferred by the front vice, however, the work cannot be retracted by the transfer vice unit. This feature of using air to bend the circular saw blade is effective because this makes it possible to accurately cut what has conventionally been considered work remainders to a fixed length. The purpose of using the transfer vice unit to retract work during fixed-length feeding is to minimize the number of times bending stress is applied to the saw blade by compressed air.

According to the present invention, in a circular cutting, even after feeding is no longer possible, further cutting is possible machine while maintaining cutting accuracy. This results in reduced amounts of work remainders.

DETAILED DESCRIPTION OF THE INVENTION

Figure 1A:
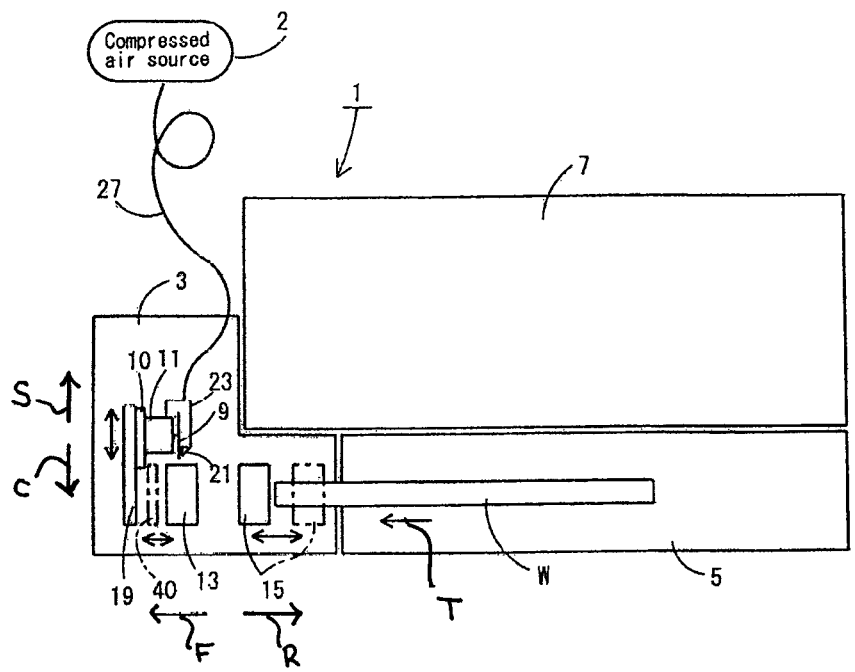
FIG. 1 shows a cutting machine of Embodiment 1, with FIG. 1(A) being a schematic diagram of the entire apparatus and FIG. 1(B) being a schematic diagram of the part concerning fixed-length feeding.

The following describes embodiments comprising a circular saw motor for rotatably driving a circular saw blade, a motor transfer unit for transferring the circular saw motor between a standby position and a cutting position, a feed unit for feeding work to the cutting position, a fixing vice unit for fixing the work in the cutting position, and also all the features described in the foregoing sections (1)-(6).

Embodiment 1

Embodiment 1 of the present invention will be described hereinafter in a concretive manner by referring to the drawings.

As shown in FIG. 1(A), the cutting apparatus 1 of Embodiment 1 includes an automatic circular sawing machine 3, a roller conveyor 5 for feeding work W in a transfer direction T to the automatic circular sawing machine 3, and a stockyard 7 for the work W. Additionally, the automatic circular sawing machine 3 includes a circular saw motor 11 on which a circular saw blade 9 is mounted, a main vice unit 13 for clamping the work W in proximity to the cutting position of the circular saw blade 9, a transfer vice unit 15 for moving between a forward end near the main vice unit 13 and a retraction end near the roller conveyor 5, a headstock 10 and a guide 19 for the headstock for reciprocating the circular saw motor 11 between the cutting position and the standby position.

Figure 1B:
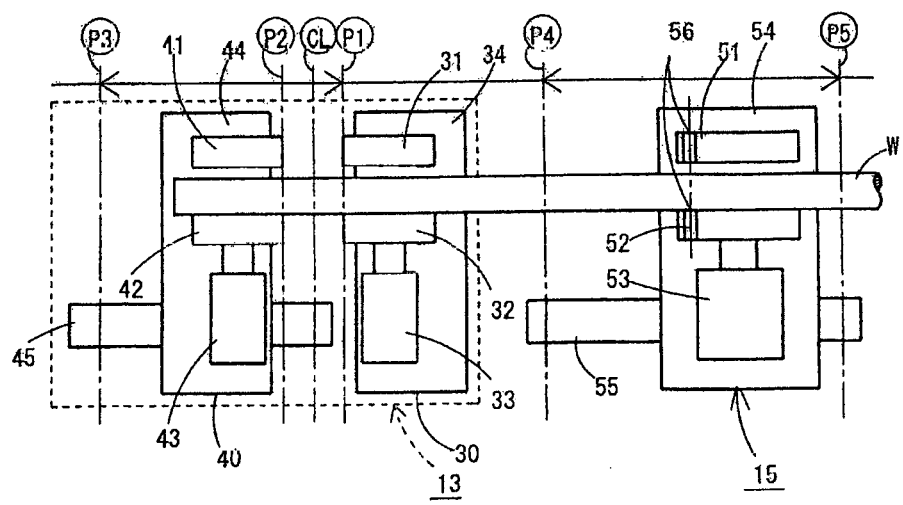

The main vice unit 13 is provided for causing a clamping cylinder to perform clamping and unclamping and configured to clamp the work W at two positions, an immediately forward and immediately rear positions, with the cutting line CL of the circular saw blade 9 located in the center therebetween. Specifically, as shown in FIG. 1(B), the main vice unit 13 includes a rear vice 30 disposed with its front end on a position P1 immediately rear of the cutting line CL and a front vice 40 to be located in a position P2 immediately forward of the cutting line CL as its preset position during cutting.

The rear vice 30 includes a fixed jaw 31 and a movable jaw 32 with a hydraulic cylinder 33 adapted to transfer the movable jaw 32 toward the fixed jaw 31 to clamp the work W therebetween. Likewise, the front vice 40 includes a fixed jaw 41 and a movable jaw 42 with a hydraulic cylinder 43 adapted to transfer the movable jaw 42 toward the fixed jaw 41 to clamp the work W therebetween.

As a feature of this embodiment, the rear vice 30 and the front vice 40 are configured to perform clamping and unclamping independently from each other. As an additional feature, the base 44 of the front vice 40 is configured to move along the guide bar 45 extending in the forward direction F and the rearward direction R. The rear end of its moving range is on the forward end position P1 of the rear vice 30, with the base movable between P1 and P3. As such, according to this embodiment, the front vice 40 is capable of moving to the position where it comes into contact with the front end of the rear vice 30 when necessary. It should be noted that the base 34 of the rear vice 30 is fixed and immovable.

The transfer vice unit 15 includes a fixed jaw 51 and a movable jaw 52 with a hydraulic cylinder 53 adapted to transfer the movable jaw 52 toward the fixed jaw 51 to clamp the work W therebetween. The base 54 of the transfer vice unit 15 is configured to move in the range between P4 and P5 along the guide bar 55 extending in the forward and rearward directions. Furthermore, photoelectric sensors 56 are mounted on the jaws 51 near their top ends so as to detect the rear end of the work W.

The back-and-forth movement of the transfer vice unit 15 and the front vice 40 is controlled by their respective servomotors and screw feed mechanisms. The transfer vice unit 15 is configured to move back and forth within its moving range with the front end position P4 as its origin. The front vice 40 is configured to move back and forth in its moving range with the rear end P1 as its origin.

Figure 2A:
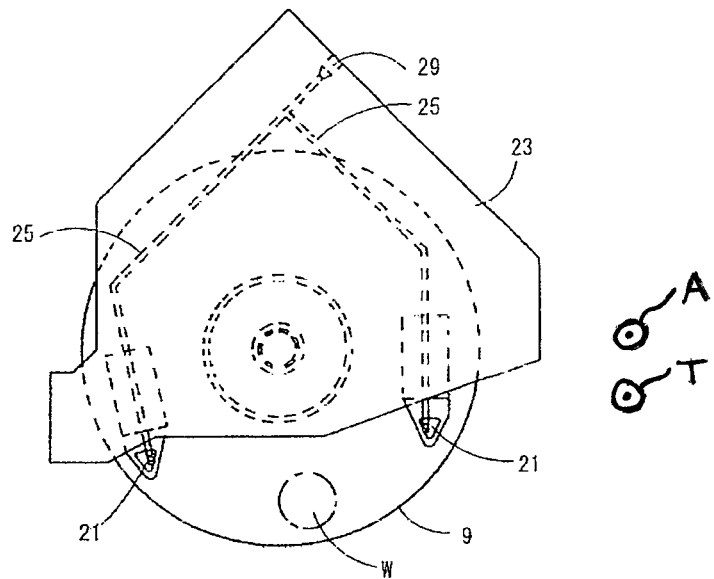
FIG. 2 shows the circular saw portion of the cutting machine of Embodiment 1, with FIG. 2(A) being a right side view and FIG. 2(B) being a horizontal cross sectional view.
Figure 2B:
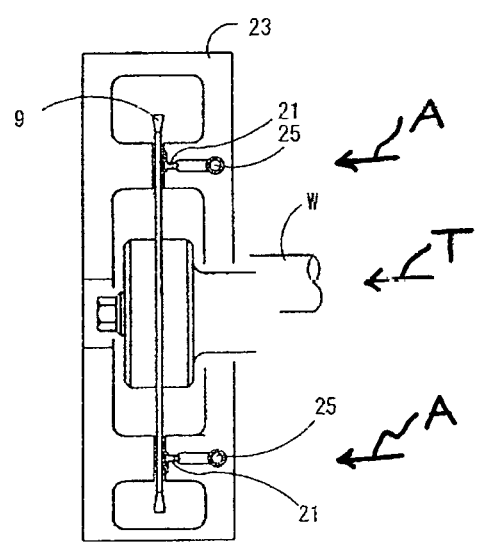

As shown in FIG. 2, the automatic circular sawing machine 3 of the cutting apparatus 1 according to Embodiment 1 is provided with two air nozzles 21 for discharging compressed air in a direction A to the work feeding side of the circular saw blade 9. These air nozzles 21 are contained inside the blade cover 23 detachably mounted on the circular saw motor 11. Each of the air nozzles 21 is positioned to discharge air in the vicinity of the circumference of the circular saw blade 9.

Provided within the saw blade cover 23 is an air passage 25 that introduces compressed air to the air nozzles 21. A universal hose 27 capable of bending flexibly connects the air passage 25 and a compressed air source 2 in the factory. Attached to the inlet of the air passage 25 is an air valve 29 that is opened and closed electromagnetically.

Figure 3:
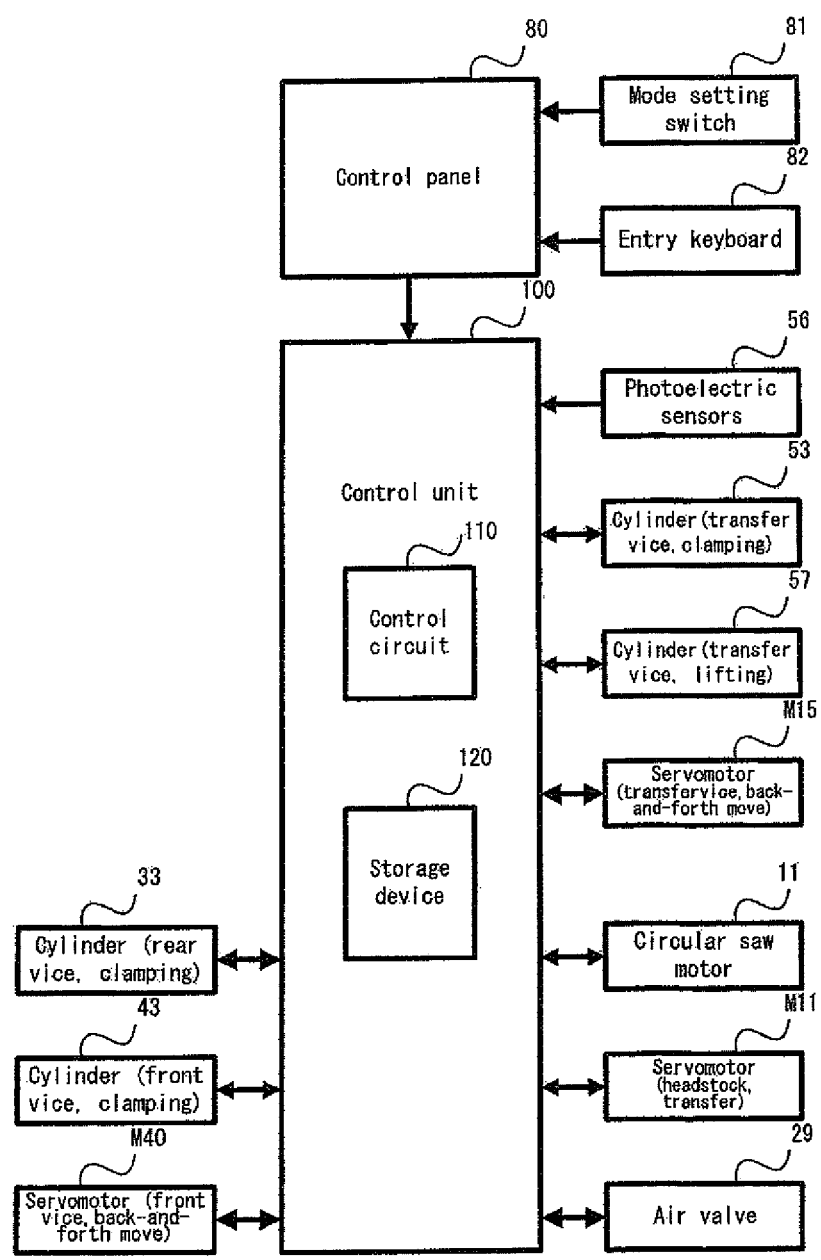
FIG. 3 is a schematic diagram of the control system of the cutting machine of Embodiment 1.
Figure 4:
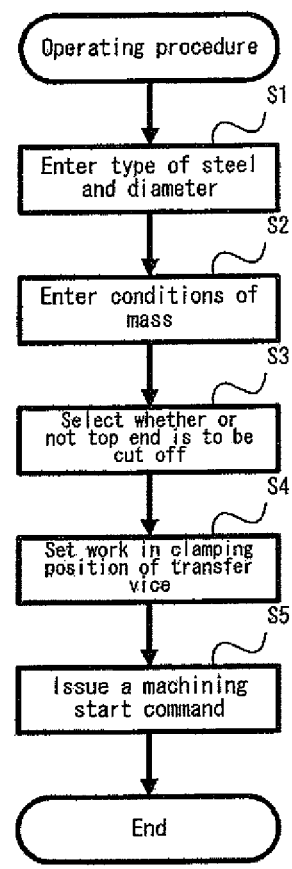
FIG. 4 is a flowchart of the operating procedure for using the cutting machine of Embodiment 1.

The cutting apparatus 1 of Embodiment 1 includes a control system configured as shown in FIG. 3. The control unit 100 is configured to receive signals from the photoelectric sensors 56 provided in the transfer vice unit 15 for detecting the rear end of work and those from the control panel 80. Furthermore, the control unit 100 is configured to transmit control signals to the clamping cylinder 53, the lifting cylinder 57, and the back-and-forth movement servomotor M15 of the transfer vice unit 15, the clamping cylinder 33 of the rear vice 30, the clamping cylinder 43 and the back-and-forth movement servomotor M40 of the front vice 40, the circular saw motor 11 and the servomotor M11 for moving the headstock of the circular cutting machine, and the air valve 29 for supplying compressed air to the air nozzles 21. It is also configured to receive encoder signals from the servomotors M15, M40, and M11.

The control panel 80 is provided for entering various settings and conditions. The control panel of Embodiment 1 features a mode setting switch 81 for switching between a first mode in which the top end of the work W is cut off before fixed-length cutting is performed and a second mode in which fixed-length cutting is performed without cutting off the top end of the work W. Additionally provided is an entry keyboard 82 for entering various types of information.

The control unit 100 includes a control circuit 110 and a storage device 120. The control circuit 110 is composed of a computer and the storage device 120 is composed of a hard disk drive and other components. The computer constituting the control circuit 110 carries out processing based on a control program for controlling the fixed-length cutting performed by the automatic circular sawing machine 3 and a processing program for calculating the amount of fixed-length feeding based on the information entered through the entry keyboard 82. The program for calculating the fixed-length feed amount carries out processing to store on the storage device 120 information about work including the type and the diameter of work W as well as the fixed-length feed amount A, which is entered through the control panel 80.

In addition to the computer programs and the fixed-length feed amount A as described above, the storage device 120 stores numerical information necessary for carrying out control processing, such as the information about the distance B between the position of the forward end of the transfer vice unit 15 and the circular saw blade 9 on the automatic circular sawing machine 3 and a reference amount $a$ for cutting off the top end, which is a value that applies if the top end is to be cut off.

Figure 5:
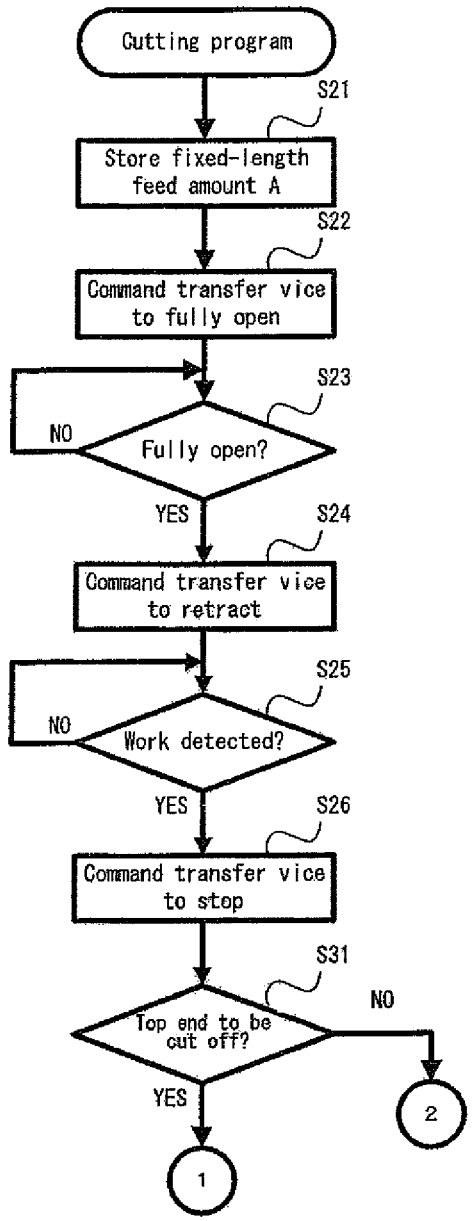
FIG. 5 is a flowchart of the control process performed by the cutting machine of Embodiment 1.

The following describes how the cutting apparatus 1 of Embodiment 1 is used to manufacture blanks of uniform mass for forging from the work W made of round-bar steel. First, the operation procedure performed by an operator will be described with reference to the flowchart of FIG. 5.

The operator enters into the control unit the type of steel and the diameter of the work W to be loaded into the stockyard 7 prior to the start of machining (S1). Next, the operator enters the conditions of mass for the blanks to be manufactured into the control unit (S2). The operator then operates the mode setting switch 81 of the control unit to select whether or not the top end is to be cut off. Upon entering these machining conditions, the operator loads the work W stocked in the stockyard 7 onto the roller conveyor 5 to set the work W in the position where the transfer vice unit 15 can clamp it securely (S4). Subsequently, the operator operates the control unit to issue a command to start machining (S5).

Figure 6:
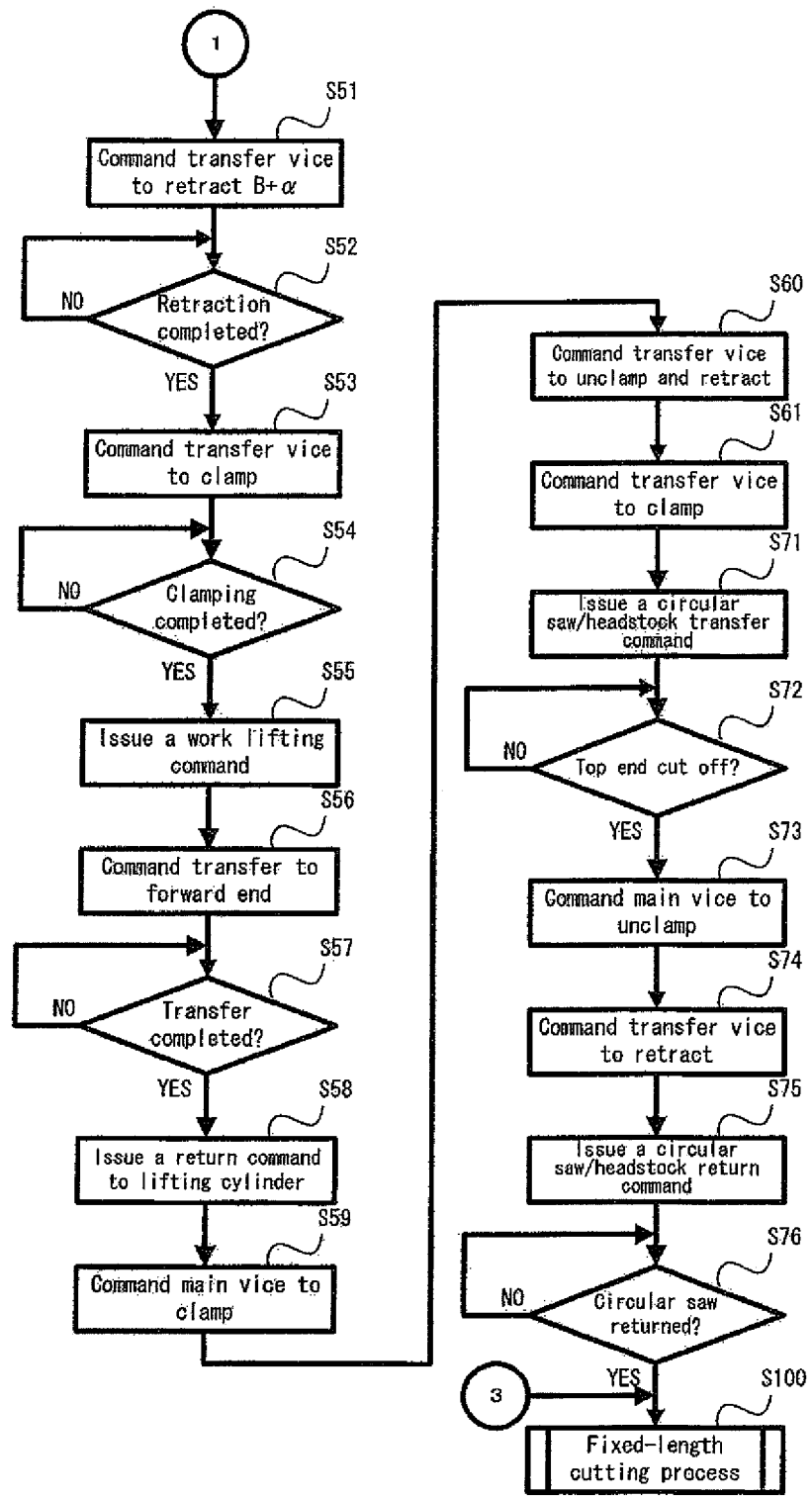
FIG. 6 is a flowchart of the control process performed by the cutting machine of Embodiment 1.

Once the operator operates the control unit to issue a command to start machining (S5), the computer of the control unit activates a cutting program to start the control process shown in FIG. 6 and later drawings.

Initially, the computer stores the fixed-length feed amount A entered by the operator through the operation panel 80 in the storage device 120 (S21). Then, the computer issues a full open command to the clamping cylinder 53 of the transfer vice unit 15 (S22). Upon detecting that the full open operation by the clamping cylinder 53 is completed (YES at S23), the computer issues a retraction command to the back-and-forth movement servomotor M15 of the transfer vice unit 15 (S24). Next, the computer waits for a work detection signal to entered from the photoelectric sensors 56 (S25). After the computer receives a work detection signal from the photoelectric sensors 56 (YES at S26), the computer issues a stop command to the back-and-forth movement servomotor M15 of the transfer vice unit 15 (S27). Then the computer determines which of the top end cutoff mode or the no-cutoff mode has been set (S31).

If the result of the determination by the computer at S31 indicates that the top end is to be cut off, the computer issues a command (retract command) to the servomotor M15 of the transfer vice unit 15 to retract the transfer vice unit 15 the distance B (the distance between the forward end position and the circular saw blade 9)+$\alpha$ (the top-end cutoff reference amount) (S51). Once the computer detects that the retraction of B+$\alpha$ caused by the servomotor M15 is completed (YES at S52), the computer issues a command to the clamping cylinder 53 of the transfer vice unit 15 to cause the unit 15 to perform clamping (S53). Once receiving a signal that indicates that the clamping by the vice is completed (YES at S54), the computer issues a command to the lifting cylinder 57 of the transfer vice unit 15 to lift the work (S55) and also issues a command to the servomotor M15 to move the transfer vice unit 15 to the forward end P4 (S56). Once receiving a signal that indicates that the transfer to the forward end caused by the servomotor M15 is completed (YES at S57), the computer issues a return command to the lifting cylinder 57 of the transfer vice unit 15 (S58) and also issues clamp commands to the rear vice clamping cylinder 33 and the front vice clamping cylinder 43 of the main vice unit 13 (S59) Then, the computer issues commands to the clamping cylinder 27 and the servomotor M15 to unclamp and retract the transfer vice unit 15 (S60) and when it is determined that the transfer vice unit 15 is returned to the preset position by the servomotor M15, the computer issues a command to the clamping cylinder 27 to cause the vice to perform clamping (S61). The series of commands issued up to this point causes the work to be set in place and clamped by the transfer vice unit 15 and the main vice unit 13 while the length of the work corresponding to the top end portion to be cut off juts out of the cutting position. In the embodiment, as soon as the top end is cut off, the cutting apparatus is in the condition for an immediate start of fixed-length cutting. It should be noted that in the embodiment, the term "preset position" refers to the position of the transfer vice unit 15 retracted the fixed-length feed amount A from the forward end P4. Furthermore, according to the embodiment, since the work W is transferred while lifted, the work may be set in place without colliding against the table at the cutting position.

Subsequently, the computer issues a drive command to the circular saw motor 11 and a command to the headstock transfer servomotor M11 to cut off the top end (S71) during which the headstock 10 with the circular saw motor 11 are moved in a cutting direction C. Once a cutoff completion signal is transmitted to the computer from the headstock transfer servomotor M11 (YES at S72), the computer issues an unclamp command to each of the clamping cylinders 33 and 43 of the main vice unit 13 (S73) and issues a retract command to the back-and-forth movement servomotor M15 of the transfer vice unit 15 to avoid interference with the circular saw blade (S74). The computer then issues a command to the circular saw transfer servomotor M11 to return the headstock 10 to the standby position (S75) by moving the headstock 10 in the standby direction S. After detecting that the circular saw is returned to the standby position (YES at S76), the computer performs the control process to carry out fixed-length cutting as described below (S100).

Figure 7:
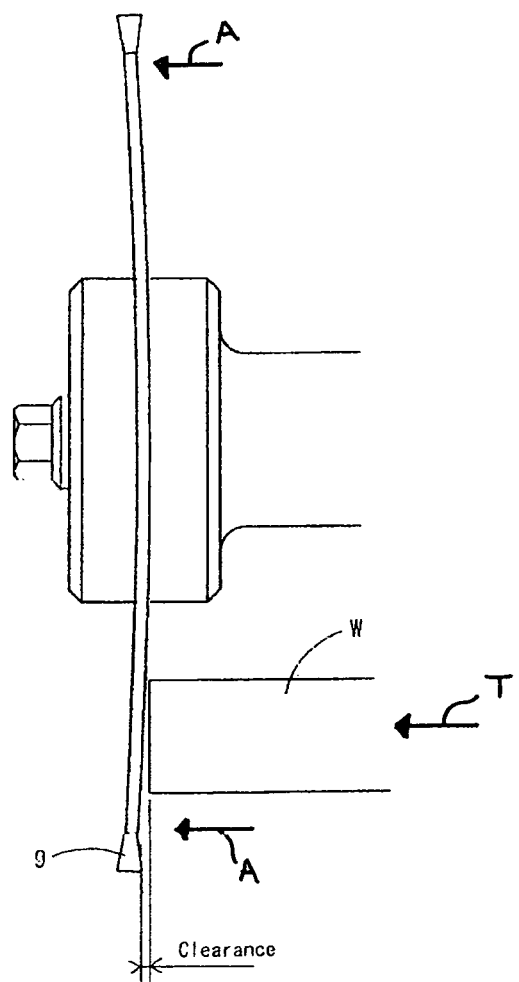
FIG. 7 is an explanatory view showing the effect and action of air discharged when the circular saw returns in Embodiment 1.

In the embodiment, as shown in FIG. 7, the discharge of compressed air in direction A causes the cutting edge of the circular saw blade 9 to slightly bend away from the work W to create a clearance between the circular saw blade and the cut surface of the work W. As a result, before the return operation of the circular saw, the work W does not have to be retracted in the rearward direction R to permit a smooth return of the circular saw blade 9 without causing the saw blade coming into contact with the work W.

Figure 8:
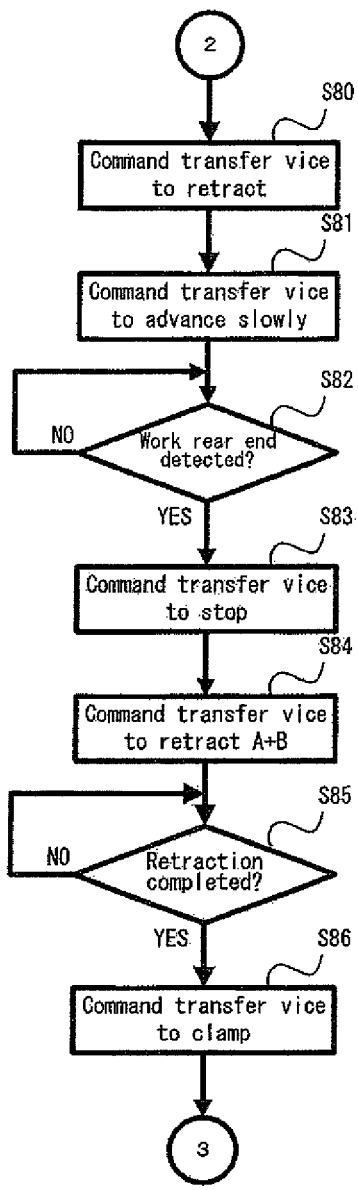
FIG. 8 is a flowchart of the control process performed by the cutting machine of Embodiment 1.

If the no-cutoff mode is selected, instead of the control process of S51-S77, as shown in FIG. 8, the computer issues a command to the servomotor M15 of the transfer vice unit 15 to transfer the unit 15 to the retraction end (S80) and then issues a command to the servomotor M15 to advance the transfer vice unit 15 at a slow speed (S81). Once detecting the top end of the work based on signals received from the photoelectric sensors 56, the computer issues a command to the servomotor M15 to halt the transfer vice unit 15 (S82 and S83). Thereafter, the computer issues a command to the servomotor M15 to retract the transfer vice unit 15 a distance of A+B (S84) and a further command to the clamping cylinder 27 to cause the transfer vice unit 15 to perform clamping at the retract position (S85 and S86). Subsequently, the computer carries out control process for fixed-length cutting (S100).

Figure 9:
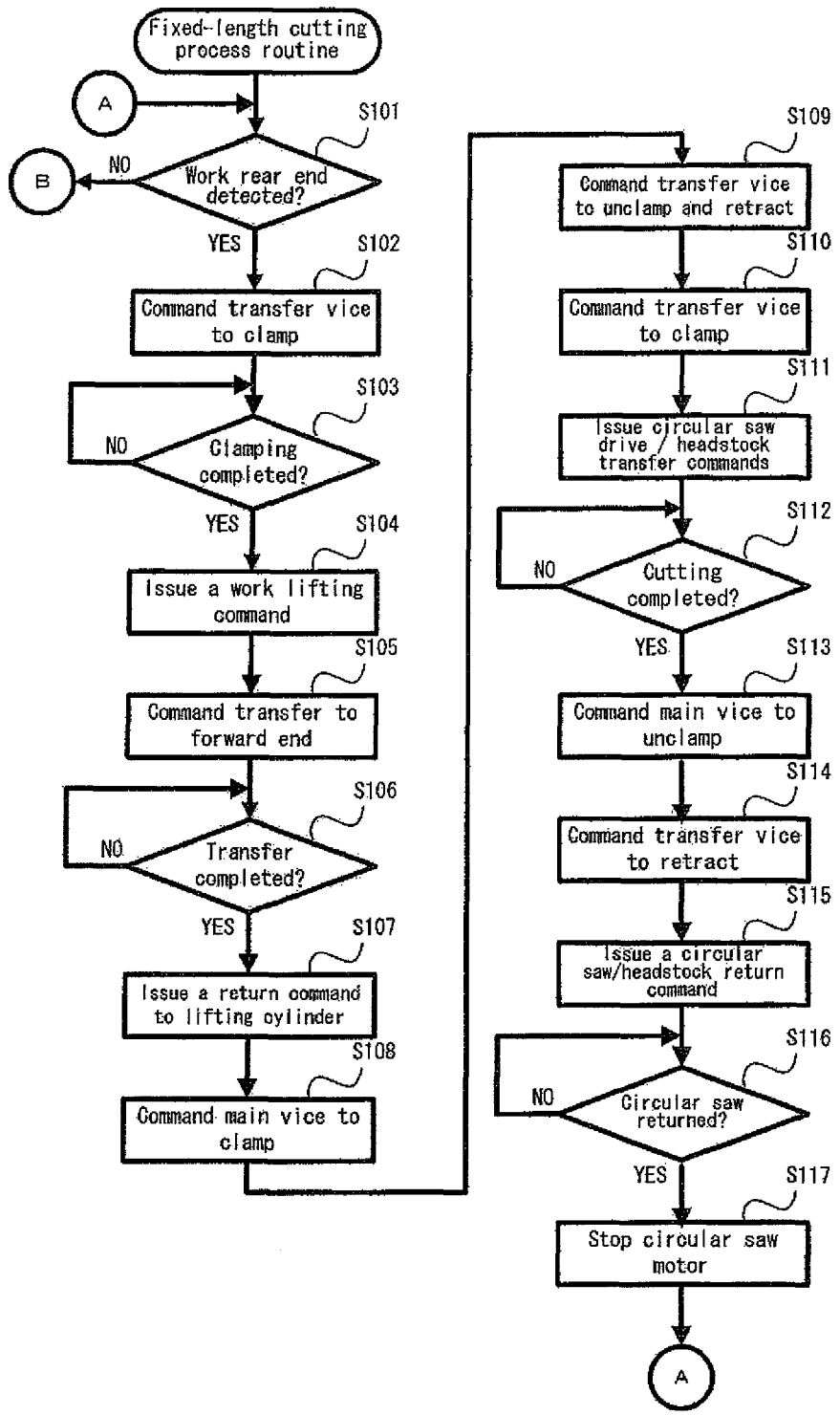
FIG. 9 is a flowchart of the fixed-length cutting process performed by the cutting machine of Embodiment 1.

To carry out the control process for fixed-length cutting (S100), as shown in FIG. 9, the computer first determines whether or not signals that indicate detection of the work have been received from the photoelectric sensors 56 of the transfer vice unit 15 returned to the preset position (S101). If the computer detects that such detection signals have been received (YES at S101), the computer issues a command to the clamping cylinder 27 of the transfer vice unit 15 to cause the unit 15 to perform clamping (S102). After the computer receives a clamp completion signal (YES at S103), the computer issues a lift command to the lifting cylinder 57 of the transfer vice unit 15 to lift the work (S104) and also issues a command to the servomotor M15 to move the transfer vice unit 15 to the forward end P4 (S105). Once it is detected in the computer that the transfer vice unit 15 has moved to the forward end (YES at S106), the computer issues a return command to the lifting cylinder 57 of the transfer vice unit 15 (S107) and also issues clamp commands to the rear vice clamping cylinder 33 and the front vice clamping cylinder 43 of the main vice unit 13 (S108). Then, the computer issues commands to the clamping cylinder 27 and the servomotor M15 to cause the transfer vice unit 15 to carry out unclamping and retraction, respectively, (S109) and when it is detected by the computer that the transfer vice unit 15 is returned to its preset position, the computer issues a clamp command to the clamping cylinder 27 (S110).

Subsequently, the computer issues a command to drive the circular saw motor 11 and a command to the headstock transfer servomotor M11 to carry out cutting (S111). Once a cutoff completion signal is transmitted to the computer from the headstock transfer servomotor M11 (YES at S112), the computer issues an unclamp command to each the clamping cylinders 33 and 43 of the main vice unit 13 (S113) and also issues a retract command to the lifting cylinder and the servomotor of the transfer vice unit 15 to slightly retract the work in order to avoid interference (S114). The computer then issues a command to the headstock transfer servomotor M11 to return the headstock to the standby position (S115). Upon detecting that the circular saw is returned to the standby position (YES at S116), the computer issues a command to stop the circular saw motor 11 (S117).

Figure 10:
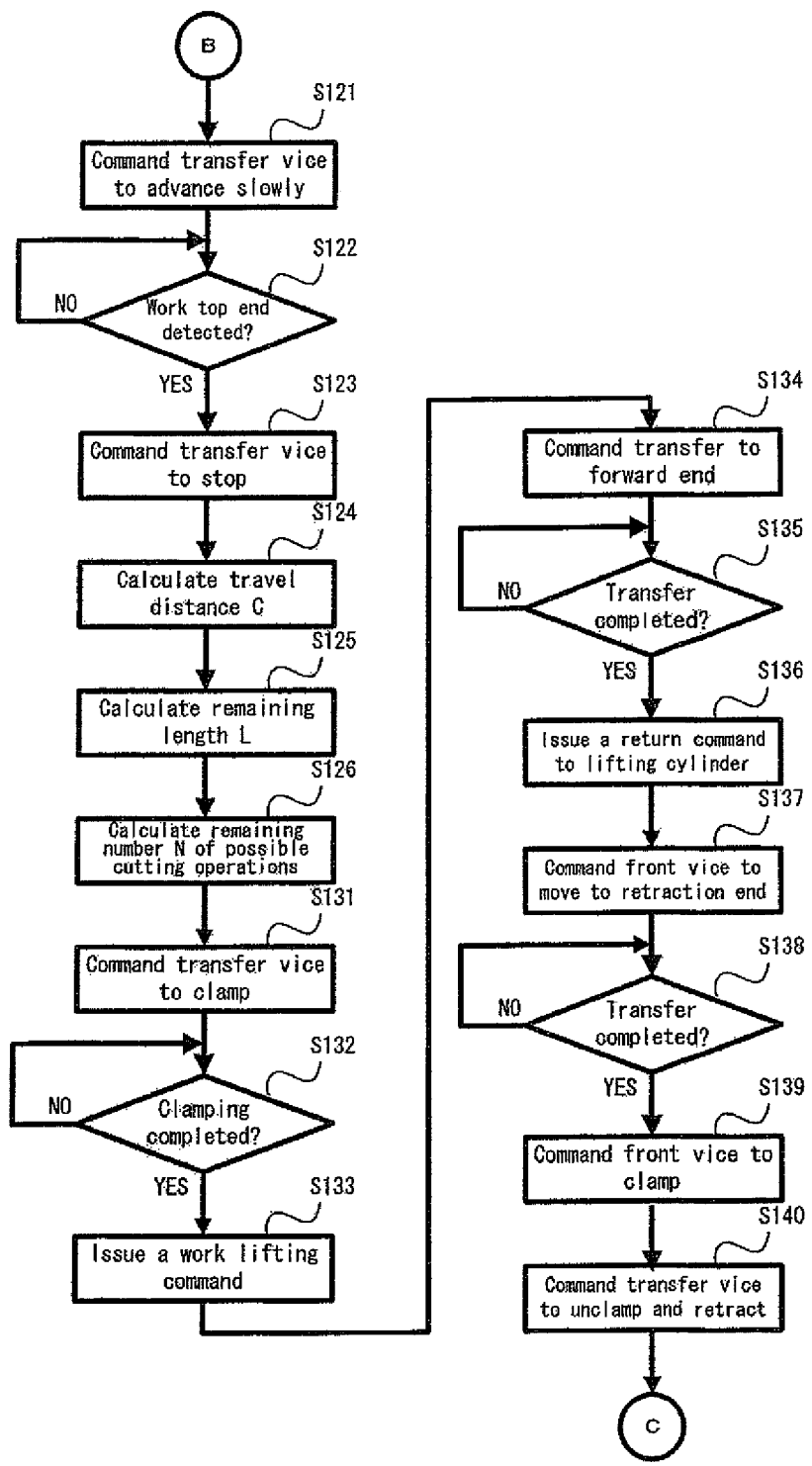
FIG. 10 is a flowchart of the fixed-length cutting process performed by the cutting machine of Embodiment 1.

If no work detection signals has been received from the photoelectric sensors 56 of the transfer vice unit 15 returned to its preset position (NO at S101), as shown in FIG. 10, the computer issues a command to the servomotor M15 of the transfer vice unit 15 to advance the unit 15 at a slow speed (S121) and also issues a halt command to the servomotor M15 when the photoelectric sensors 56 detect the rear end of the work (S122 and S123). Next, the computer calculates the travel distance C between the preset position for a fixed-length feed and the position at which it is determined YES at 5122 (S124). Furthermore, the computer calculates the remaining length L from the apparatus-specific dimension B (the distance between the forward end position P4 of the transfer vice unit 15 and the circular saw blade 9), the fixed-length feed amount A, and the travel distance C (L=B+A−C) (S125). Subsequently, the computer calculates the remaining number N of possible cutting operations by dividing the remaining length L minus the length X necessary for the rear vice 30 to perform clamping (L−X) by the fixed-length feed amount A to calculate (S126). In this calculation, the computer determines the remaining number N of possible cutting operations by discarding the fractional portion of the value (L−X)/A.

Next, the computer issues a command to the clamping cylinder 27 to cause the transfer vice unit 15 to perform clamping at this position (S131 and S132), a lift command to the lifting cylinder 57 of the transfer vice unit 15 (S133), and a command to the servomotor M15 to move the transfer vice unit 15 to the forward end P4 (S134).

Once the computer detects that the transfer vice unit 15 has completed its movement to the forward end based on a received signal (YES at S135), the computer issues a return command to the lifting cylinder 57 of the transfer vice unit 15 (S136) and also issues a command to the back-and-forth movement servomotor M40 of the front vice 40 to transfer the front vice 40 to the retraction end P1 (S137). Once the computer detects, based on a received signal, that the transfer of the front vice to the retraction end is completed (YES at S138), the computer issues a clamp command only to the clamping cylinder 43 of the front vice 40 (S139). Furthermore, the computer issues commands to the clamping cylinder 27 and the servomotor M15 of the transfer vice unit 15 to unclamp and retract the unit 15, respectively (S140).

Figure 11:
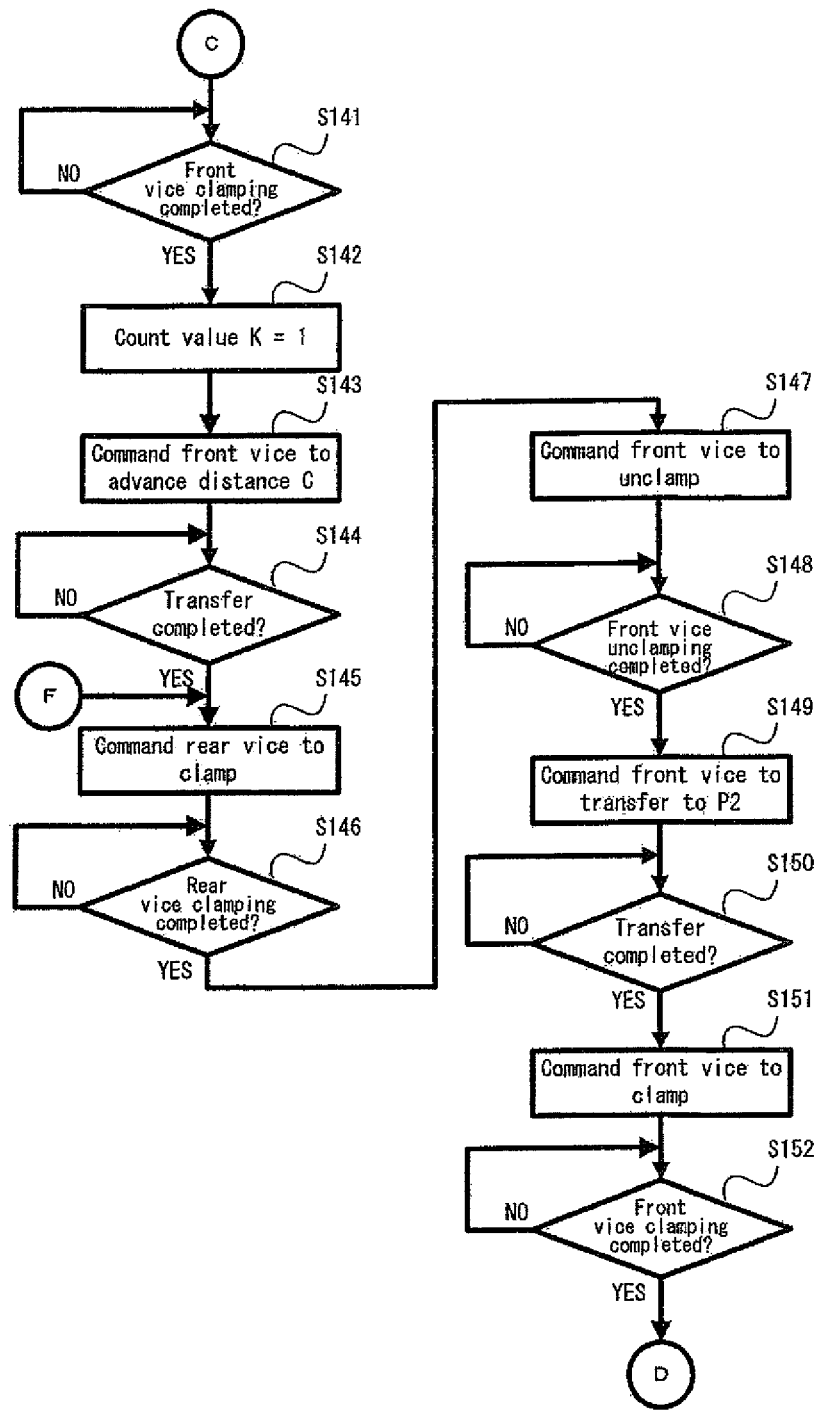
FIG. 11 is a flowchart of the fixed-length cutting process performed by the cutting machine of Embodiment 1.

Subsequently, as shown in FIG. 11, when the computer detects the front vice 40 has completed clamping (YES at S141), the computer sets the count value K to 1 (S142) and issue a command to the back-and-forth movement servomotor M40 to advance the front vice 40 the distance C calculated at S124 (S143). When it is detected by the computer that advance is completed (YES at S144), the computer issues a clamp command to the clamping cylinder 33 of the rear vice 30 (S145). Upon detecting that the rear vice 30 has completed clamping (YES at S146), the computer issues an unclamp command to the front vice 40 (S147).

Once the computer detects that the front vice 40 has completed unclamping (YES at S148), the computer issues a command to the back-and-forth movement servomotor M40 of the front vice 40 to transfer to the preset cutting position P2 (S149). Once the computer detects that the transfer is completed (YES at S150), the computer issues a clamp command to the clamping cylinder 43 of the front vice 40 (S151). This causes the work W to be clamped by both of the front vice 40 and the rear vice 30.

Figure 12:
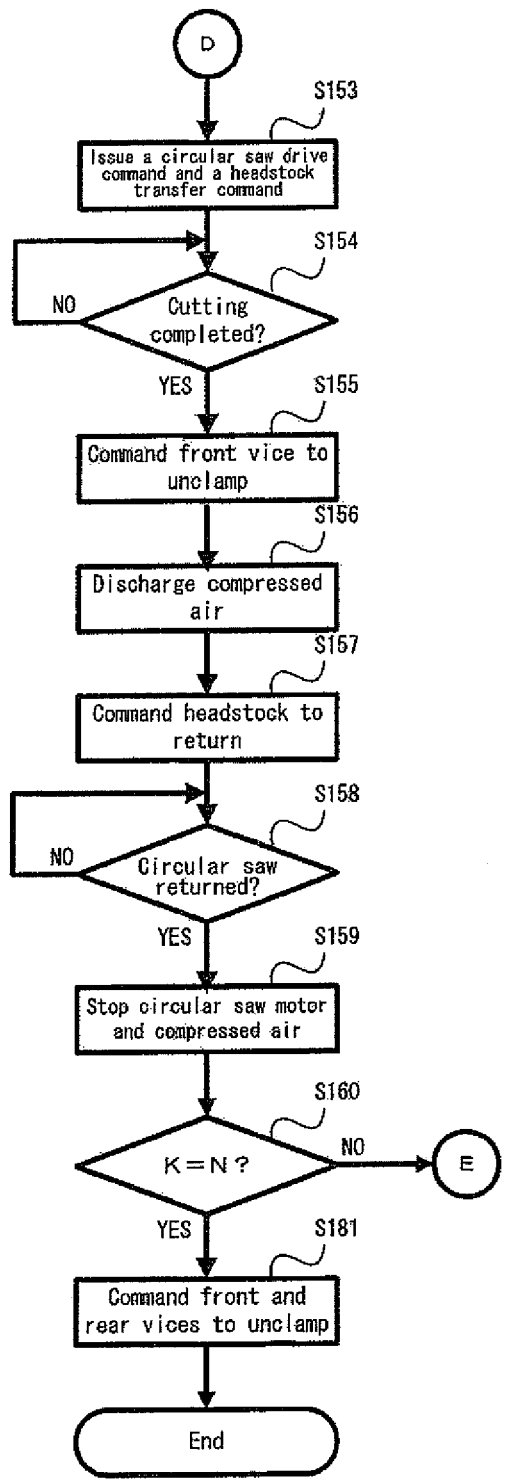
FIG. 12 is a flowchart of the fixed-length cutting process performed by the cutting machine of Embodiment 1.

After the computer detects that the front vice 40 has completed clamping (YES at S152), the computer issues a drive command to the circular saw motor 11 and also issues a command to the headstock transfer servomotor M11 to perform cutting (S153) as shown in FIG. 12. Once a signal indicating completion of the cutting is received from the headstock transfer servomotor M11 (YES at S154), the computer issues an unclamp command only to the clamping cylinder 43 of the front vice 40 (S155) and also issues a command to open the air valve 29 to start discharging compressed air from the nozzles 21 (5156). The computer then issues a command to the headstock transfer servomotor M11 to return the headstock to the standby position (S157). Upon detecting the circular saw is returned to the standby position (YES at S158), the computer issues commands to stop the circular saw motor 11 and close the air valve 29 to terminate the discharge of compressed air (S159).

Figure 13:
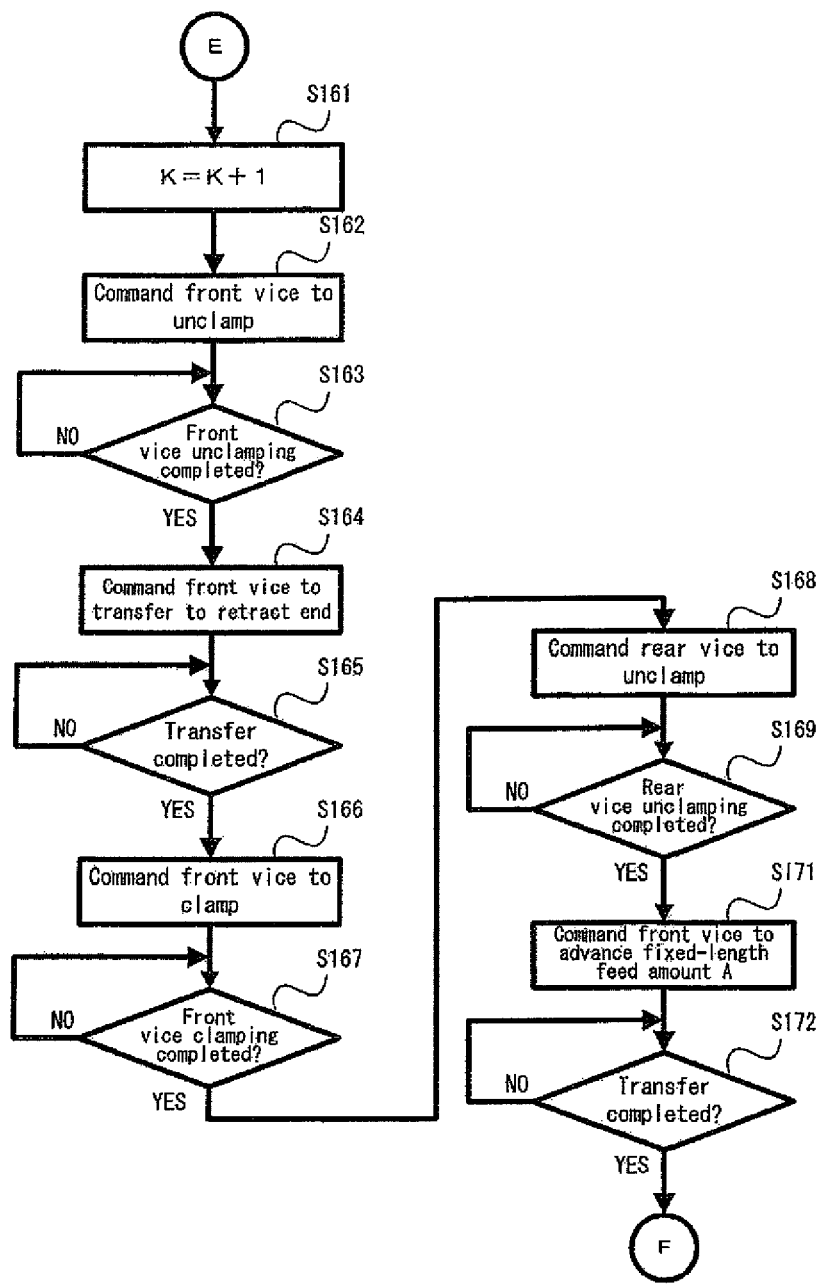
FIG. 13 is a flowchart of the fixed-length cutting process performed by the cutting machine of Embodiment 1.

Next, the computer determines whether or not the count value K equals N (S160). If the computer determines K<N (NO at S160), the computer increments the count value K (S161) as shown in FIG. 13 and then issues a command to the back-and-forth movement servomotor M40 of the front vice 40 to transfer the front vice 40 to the retraction end P1 (S162). Once the computer detects that the front vice 40 has been transferred to the retraction end (YES at S163), the computer issues a clamp command to the clamping cylinder 43 of the front vice 40 (S164). After the computer detects that the front vice 40 has completed clamping (YES at S165), the computer issues an unclamp command to the clamping cylinder 33 of the rear vice 30 (S166). Once the computer detects that the rear vice 30 has completed unclamping (YES at S167), the computer issues a command to the back-and-forth movement servomotor M40 of the front vice 40 to advance the front vice 40 the fixed-length feed amount A (S171). After the computer detects that the front vice 40 has completed its advance (YES at S172), the control process carried out by the computer returns to the process steps at S145 and later.

If the computer determines K=N (YES at S160), the computer issues an unclamp command to each of the clamping cylinder 33 of the rear vice 30 and the clamping cylinder 43 of the front vice 40 and then terminates the fixed-length cutting routine (S181).

Figure 14A:
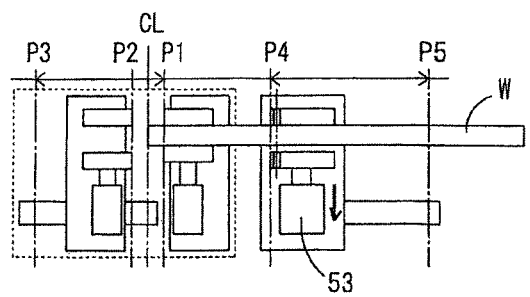
FIG. 14 is a schematic diagram showing the fixed-length cutting process performed by Embodiment 1.
Figure 14B:
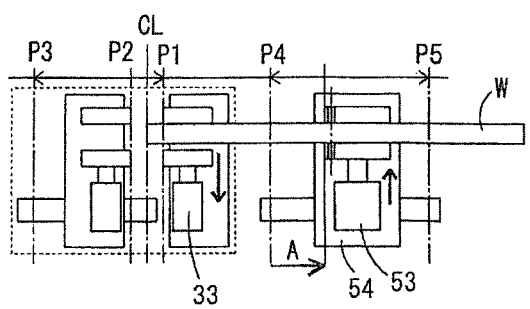
Figure 14C:
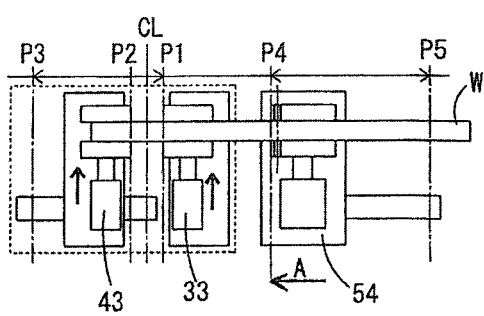
Figure 14D:
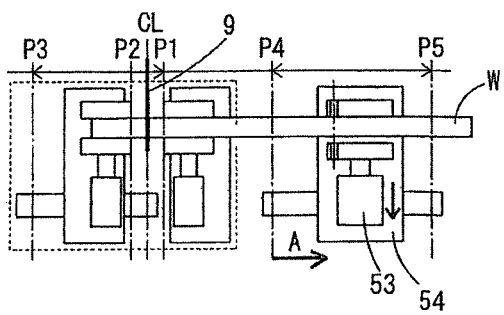
Figure 15A:
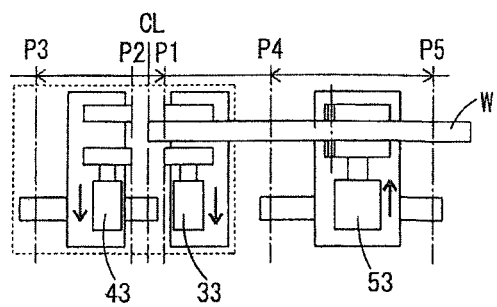
FIG. 15 is a schematic diagram showing the fixed-length cutting process performed by Embodiment 1.
Figure 15B:
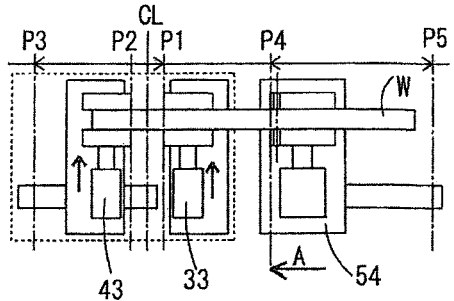
Figure 15C:
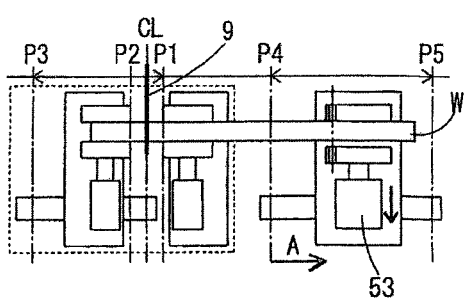
Figure 15D:
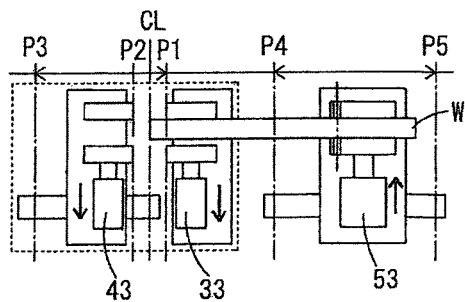

After the top end is cut off or set in place as shown in FIGS. 14(A) and (B), according to this embodiment, through execution of the control process for fixed-length cutting thus described (S100), the transfer vice unit 15 feeds the fixed-length feed amount A of work W at a time under control of the computer, allowing the circular saw blade 9 to cut the work as shown in FIG. 14(C)-16(A). This continues as long as work detection signals are received from the photoelectric sensors 56 when the transfer vice unit 15 retracts to provide for a fixed-length feed. During this time, the clamping cylinders 43 and 33 of the front and rear vices 40 and 30 of the main vice unit 13 perform clamping and unclamping simultaneously (see FIG. 14(C), FIG. 15(B), FIG. 15(D), and FIG. 16(A)).

Figure 16A:
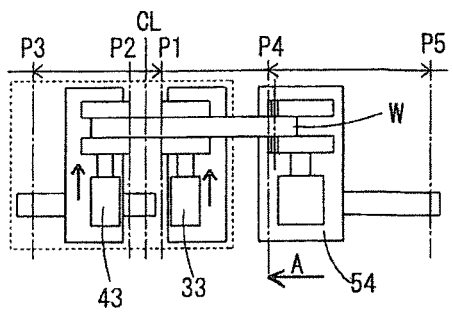
FIG. 16 is a schematic diagram showing the fixed-length cutting process performed by Embodiment 1.
Figure 16B:
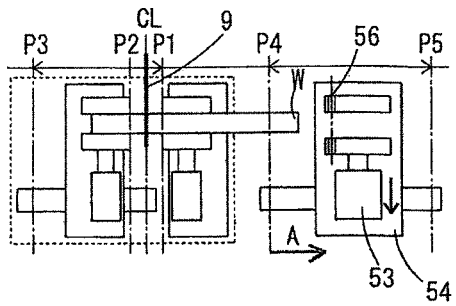
Figure 16C:
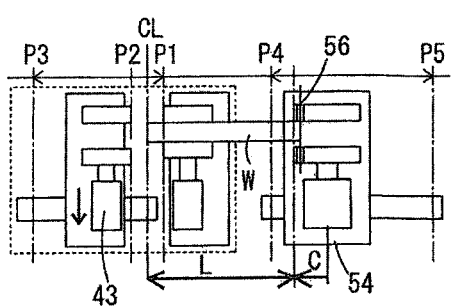
Figure 16D:
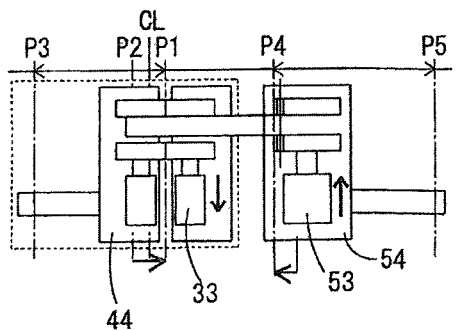
Figure 17A:
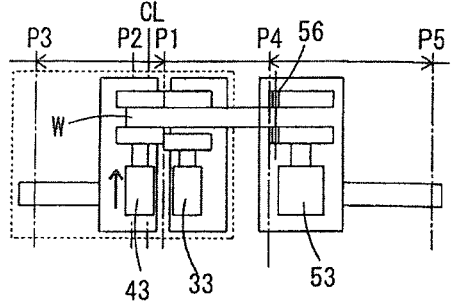
FIG. 17 is a schematic diagram showing the fixed-length cutting process performed by Embodiment 1.
Figure 17B:
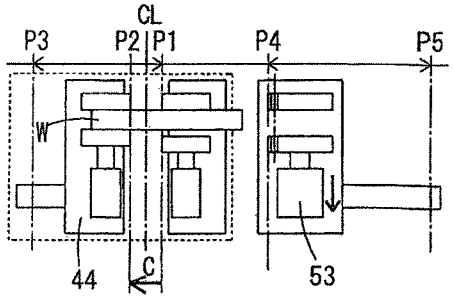
Figure 17C:
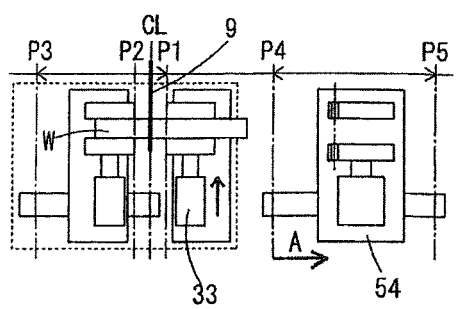
Figure 17D:
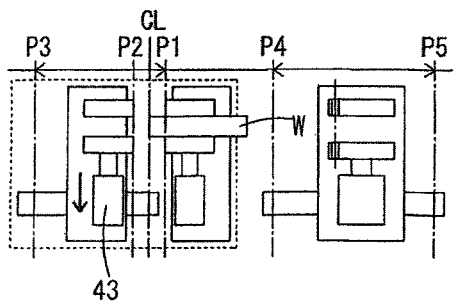
Figure 18A:
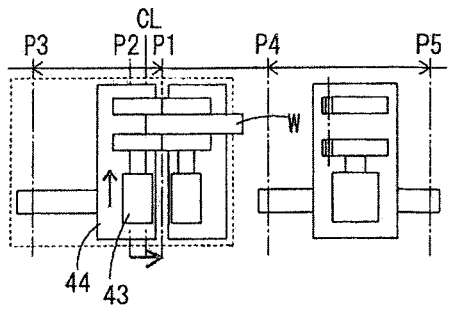
FIG. 18 is a schematic diagram showing the fixed-length cutting process performed by Embodiment 1.
Figure 18B:
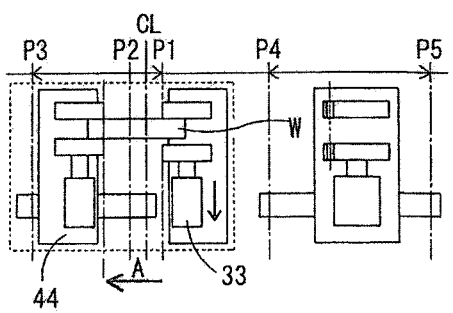
Figure 18C:
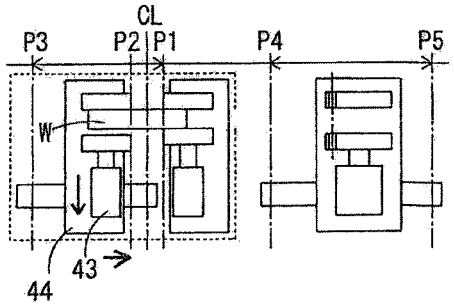
Figure 18D:
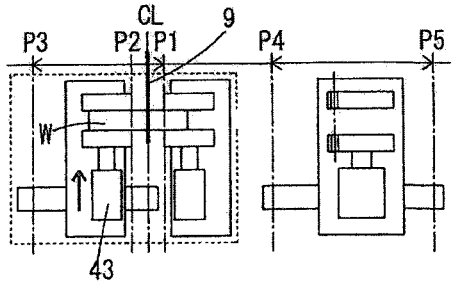
Figure 18E:
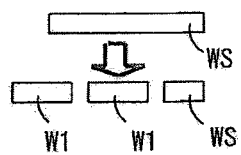
Figure 19:
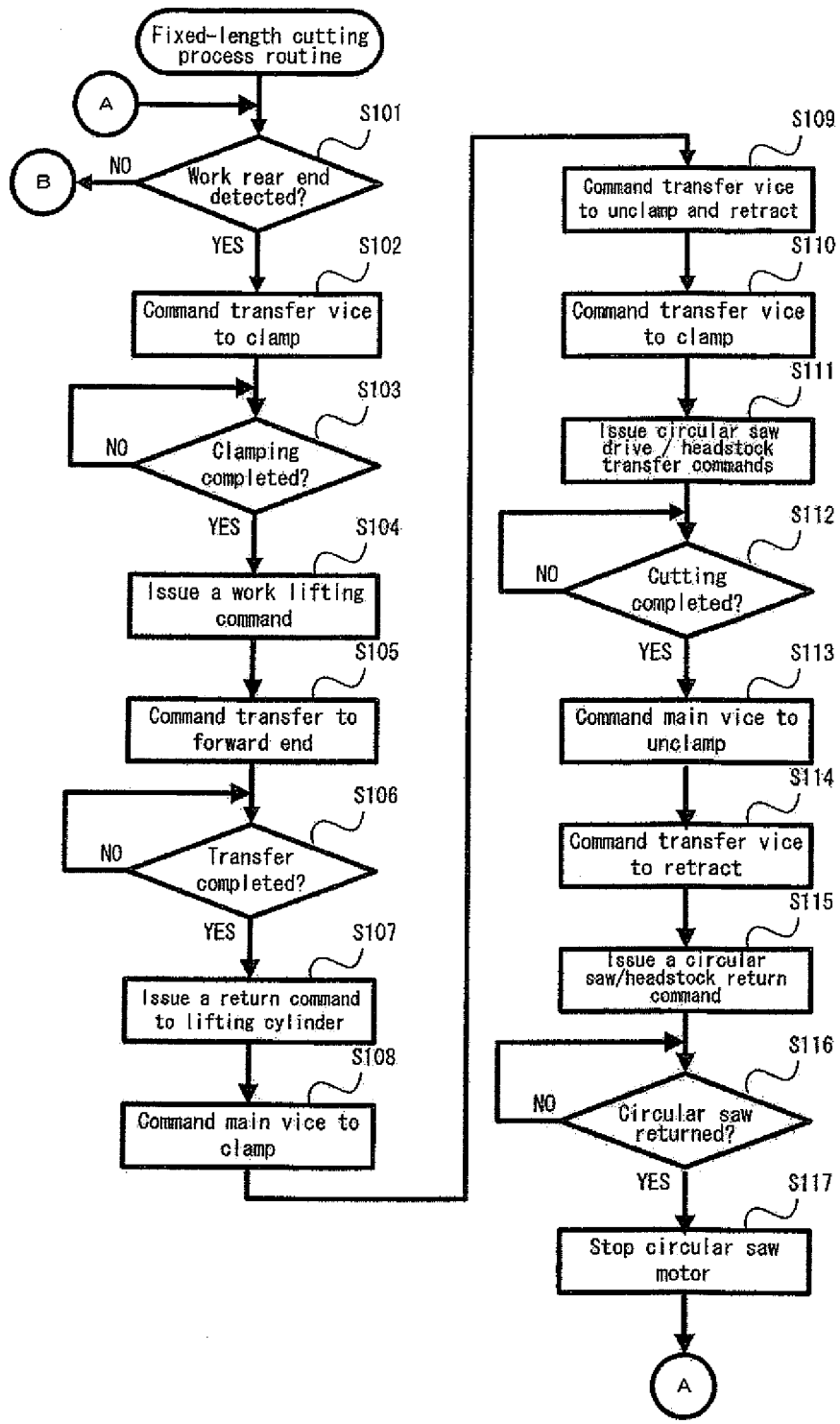
FIG. 19 is a flowchart of the fixed-length cutting process performed by the cutting machine of Embodiment 2.

When work detection signals are no longer received from the photoelectric sensors 56 as the transfer vice unit 15 retracts as shown in FIG. 16(B), the transfer vice unit 15 is advanced at a low speed under control of the computer as shown in FIG. 16(C) to calculate the remaining cuttable length L of the work W. After the transfer vice unit 15 performs the last feeding operation as shown in FIGS. 16(C) and (D), under control of the computer, the front vice 40 is retracted to the rear end of its moving range, that is, the position where its jaws come into contact with the jaws of the rear vice 40 as shown in FIGS. 16(D) and 17(A) to clamp and pull out the work W the distance C, which could not be fed by the transfer vice unit 15. This action completes the feeding of the fixed-length amount A by compensating for what was not fed in the last feeding operation by the transfer vice unit 15 as shown in FIGS. 16(C) and (D). Subsequently, as shown in FIG. 17(C), under control of the computer, cutting is performed after the front vice 40 is returned to the preset cutting position P2. Then, with the work W clamped by the rear vice 30 and unclamped by the front vice 40, the front vice 40 is retracted until the jaws of the front vice 40 and those of the rear vice 40 come into contact with one another. Thereupon, the front vice 40 clamps and pulls out the work W the fixed-length feed amount A (see FIG. 17(D)-FIG. 18(B)). This action achieves a fixed-length feed of the work W even after the transfer vice unit 15 is no longer capable of feeding the work W. The front vice 40 repeatedly pulls out the work until the count value K equals N so as to maximize the number of blanks W1 that can be made and minimize the length of the work remainder WS.

Moreover, the cutting apparatus 1 of Embodiment 1 can bend the cutting edge by using air. Accordingly, interference between the work W and the cutter can be avoided even if the transfer vice unit 15 does not retract the work during the return operation of the circular saw. This also advantageously facilitates continuation of the fixed-length cutting by using the front vice 40 to pull out the work after the transfer vice unit 15 becomes no longer capable of feeding or retracting the work. Furthermore, the cycle time for continuous fixed-length cutting is shortened by eliminating retraction during fixed-length cutting by the transfer vice unit 15. It should be noted that the cutting edge does not come into contact with blanks W1 manufactured by the cutting apparatus 1 as these products are removed from the cutting position upon completion of the cutting through a chute or as similar element.

Embodiment 2

Figure 20:
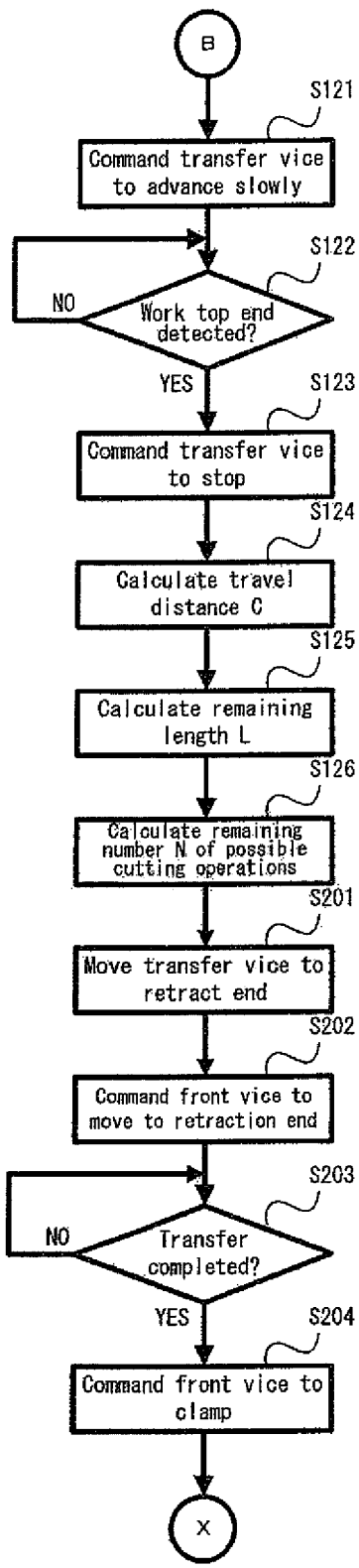
FIG. 20 is a flowchart of the fixed-length cutting process performed by the cutting machine of Embodiment 2.
Figure 21:
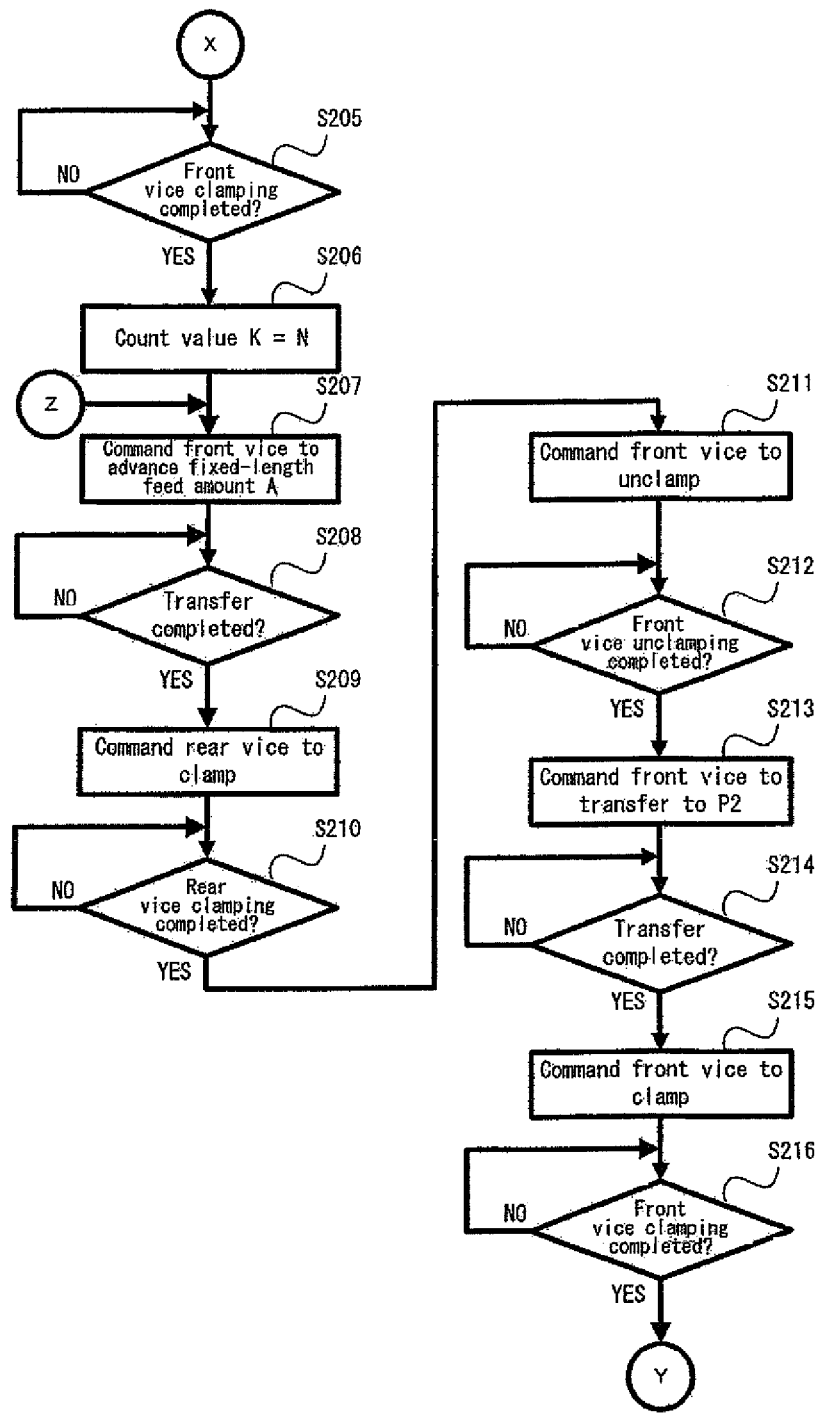
FIG. 21 is a flowchart of the fixed-length cutting process performed by the cutting machine of Embodiment 2.

Embodiment 2 is identical with Embodiment 1 in terms of the constitution of the apparatus. This embodiment differs from Embodiment 1 in that, in the routine for controlling fixed-length cutting, when the computer no longer receives work detection signals from the photoelectric sensors 56 (NO at S101), the computer carries out the processing shown in FIG. 20 and later, instead of that at 5131 and later. Specifically, the computer issues a slow advance command to the servomotor M15 of the transfer vice unit 15 (S121) and also issues a halt command to the servomotor M15 when the photoelectric sensors 56 detect the rear end of work (S122 and S123), whereupon the computer calculates the travel distance C (S124) to determine the remaining length L=B+A−C(S125). After calculating the remaining number N of cutting operations possible by dividing the remaining length L minus the length X necessary for the rear vice 30 to perform clamping (L−X) by the fixed-length feed amount A (S126), the computer issues a command to move the transfer vice unit 15 to the retraction end P5 as shown in FIG. 20 (S201). Next, the front vice 40, which at the moment is unclamped, is transferred to the retraction end P1 (S202). Upon detecting that the transfer to the retraction end is completed (YES at S203), the computer issues a command to the clamping cylinder of the front vice 40 to cause the front vice to perform clamping (S204). Subsequently, as shown in FIG. 21, when detecting the clamping is completed (YES at S205), the computer sets the count value K to 1 (S206) and issues a command to the back-and-forth movement servomotor M40 to advance the front vice the fixed-length feed amount A (S207). Upon detecting the advance is completed (YES at S208), the computer issues a clamp command to the clamping cylinder 33 of the rear vice 30 (S209). Upon detecting that the rear vice 30 has completed clamping (YES at S210), the computer issues an unclamp command to the front vice 40 (S211). Once the computer detects that the front vice 40 has completed unclamping (YES at S212), the computer issues a command to the back-and-forth movement servomotor M40 of the front vice 40 to transfer the front vice 40 to the preset cutting position P2 (S213). Once the computer detects the transfer is completed (YES at S214), the computer issues a clamp command to the clamping cylinder 43 of the front vice 40 (S215).

Figure 22:
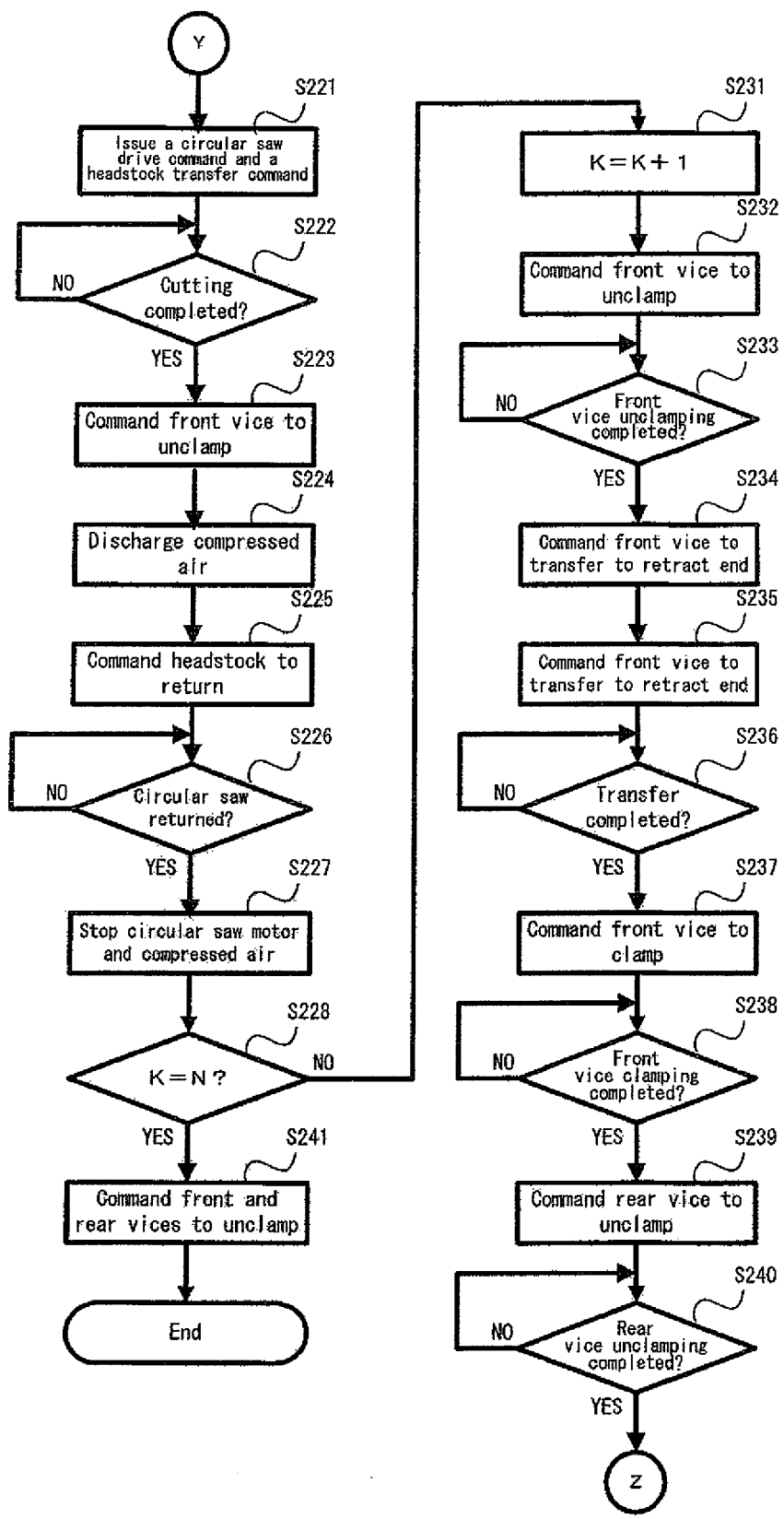
FIG. 22 is a flowchart of the fixed-length cutting process performed by the cutting machine of Embodiment 2.
Figure 23A:
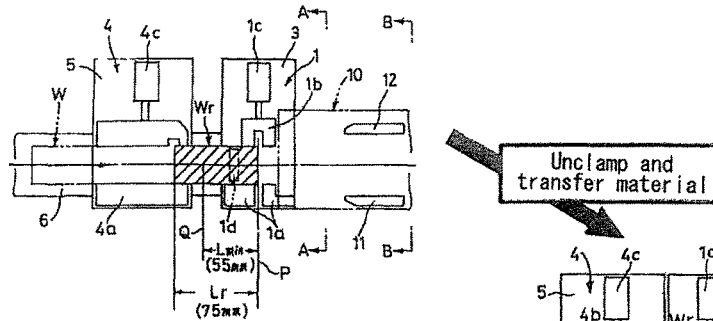
FIG. 23 is an explanatory view showing prior art.
Figure 23B:
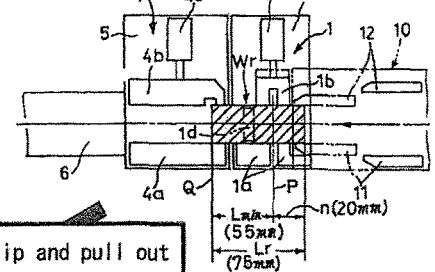
Figure 23C:
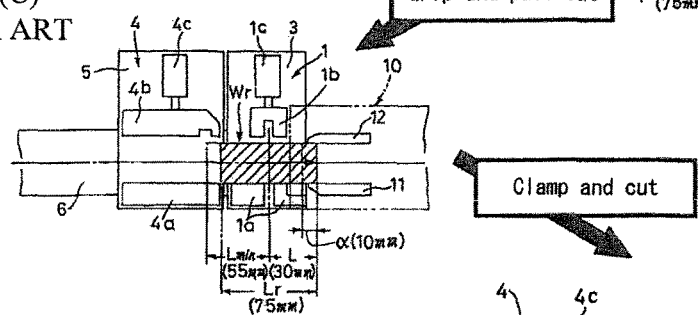
Figure 23D:
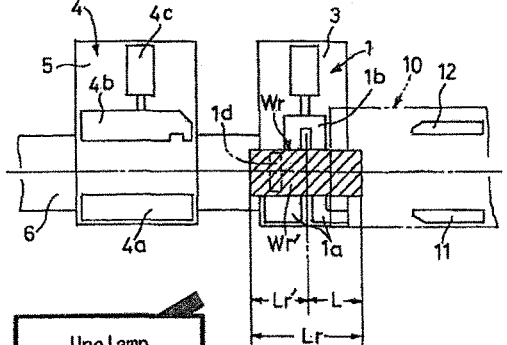
Figure 23E:
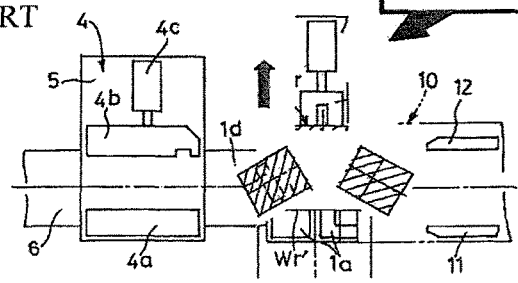

Upon detecting that the front vice 40 has completed clamping (YES at S216), the computer issues a drive command to the circular saw motor 11 and also issues a command to the headstock transfer servomotor M11 to perform cutting (S221) as shown in FIG. 22. Once the computer receives a cutting completion signal from the headstock transfer servomotor M11 (YES at S222), the computer issues an unclamp command only to the clamping cylinder 43 of the front vice 40 (S223) and also issues a command to open the air valve 29 to start discharging compressed air from the nozzles 21 (S224). The computer then issues a command to the headstock transfer servomotor M11 to return the headstock to the standby position (S225). Upon detecting the circular saw is returned to the standby position (YES at S226), the computer issues commands to stop the circular saw motor 11 and close the air valve 29 to terminate the discharge of compressed air (S227).

Next, the computer determines whether or not the count value K equals N (S228). If the computer determines K<N (NO at S228), the computer increments the count value K (S231) and then issues a command to the back-and-forth movement servomotor M40 of the front vice 40 to transfer the front vice 40 to the retraction end P1 (S232). After detecting that the front vice 40 has been transferred to the retraction end (YES at S233), the computer issues a clamp command to the clamping cylinder 43 of the front vice 40 (S234). After detecting that the front vice 40 has completed clamping (YES at S235), the computer issues an unclamp command to the clamping cylinder 33 of the rear vice 30 (S236). After the computer detects that the rear vice 30 has completed unclamping (YES at S237), the control process carried out by the computer returns to the process steps at 5207 and later.

If the computer determines K=N (YES at S228), the computer issues an unclamp command to each of the clamping cylinder 33 of the rear vice 30 and the clamping cylinder 43 of the front vice 40 to terminate the fixed-length cutting routine (S241).

According to Embodiment 2, through execution of the control process for fixed-length cutting thus described. after the transfer vice unit 15 is no longer capable of fixed-length cutting, the front vice 20 pulls out the fixed-length feed amount A of work W at a time for repeated cutting so as to minimize the length of work remainder WS. Moreover, as in Embodiment 1, the cutting apparatus 2 of Embodiment 1 is also capable of bending the cutting edge by using air.

Having described embodiments of the present invention as above, the present invention is not limited to these embodiments but may be modified in various manners without departing from the scope of the invention.

The invention claimed is:

1. A circular cutting machine comprising:
   (1) a headstock transfer unit for transferring a headstock between a standby position and a cutting position, the headstock mounting a circular saw motor for rotatably driving a circular saw blade;
   (2) a transfer vice unit for feeding a work by advancing the work toward the cutting position;
   (3) a main vice unit for clamping the work forward and rear of and across the cutting position;
   (4) a fixed length cutting controller for drivably controlling the circular saw motor, the headstock transfer unit, the transfer vice unit, and the main vice unit to perform fixed length cutting of the work; and
   (5) work end detection sensors for detecting a rear end of the work;

wherein:
   (a) the main vice unit comprises a rear vice and a front vice, the rear vice being fixed in forward and rearward directions in a prescribed position rear of the cutting position and the front vice having, as a preset position thereof during cutting, a prescribed position forward of and across the cutting position from the rear vice, the front vice being movably disposed in the forward and rearward directions in a range between a position forward of its preset position and a rearmost position where rear ends of jaws of the front vice are in contact with front ends of jaws of the rear vice, the front vice and the rear vice including separate clamping cylinders capable of being independently controllable so that the front vice performs clamping and unclamping independently of clamping and unclamping by the rear vice;
   (b) the fixed length cutting controller comprises a processor and a storage device, the processor being configured to execute computer program processes, comprising a fixed-length cutting process, a determination process, a work pullout process, and a work remainder cutting process;
   (c) the fixed length cutting process is for cutting the work to a fixed-length, and when executed by the processor configures the fixed-length cutting controller to perform the following:
      (c)(i) actuate clamping by the transfer vice unit of the work at the standby position and advancing the work a fixed length feed amount from the standby position by moving the transfer vice unit, while the front vice and the rear vice are controlled to remain unclamped during this step;
      (c)(ii) after the advancing in step (c)(i) is completed, controlling the front vice and the rear vice to clamp the work in their respective prescribed positions forward and rear of a cutting line;
      (c)(iii) cutting the work by driving the circular saw motor and controlling the position of the headstock transfer unit;
      (c)(iv) after the cutting of the work is completed, returning the transfer vice unit to its standby position, and activating the transfer vice unit to clamp the work;
      (c)(v) actuating the front vice and the rear vice to unclamp the work;
      (c)(vi) after causing the transfer vice unit to advance the fixed length feed amount from the standby position with the work clamped by the transfer vice unit, actuating the front vice and the rear vice to clamp the work in their respective prescribed positions forward and rear of the cutting line; and (c)(vii) cutting the work by driving the circular saw motor and controlling the position of the headstock transfer unit;

(d) the determination process configures the fixed-length cutting controller to calculate a remaining length of the work currently undergoing fixed length cutting based on detection signals from the work end detection sensors and determines whether or not the remaining length has become insufficient to permit the transfer vice unit to advance the work the fixed length feed amount;

(e) when the determination process determines that the remaining length of the work has become insufficient to permit the transfer vice unit to advance the work the fixed length feed amount, the work pullout process is executed configuring the fixed-length cutting controller to cause the front vice to retract to the rearmost position while the front vice and rear vice remain unclamped from the work, and then cause the front vice alone, without the rear vice, to clamp and advance the work a predetermined pullout amount so as to position the work, which can no longer be fed the fixed length, forward of the cutting line the length equivalent to the fixed length feed amount; and (f) after the work pullout process causes the front vice to pull out the work, the work remainder cutting process is performed, which configures the fixed-length cutting controller to perform the following:

(f)(i) actuating the rear vice to clamp the work and actuating the front vice to unclamp the work and retract;

(f)(ii) determining when the front vice has reached a prescribed position forward of the cutting position, and stopping position movement of the front vice at the prescribed position forward of the cutting position and then actuating the front vice to clamp the work again; and (f)(iii) cutting the work by driving the circular saw motor and controlling the position of the headstock transfer unit, while the work is clamped by the front vice and the rear vice in the prescribed positions forward and rear of the cutting position so as to further cut the work which remains and can no longer be transferred the fixed length feed amount by the transfer vice unit.

2. The circular cutting machine according to claim 1, wherein the fixed length cutting controller is configured during execution of the work pullout process to advance the front vice from the rearmost position by the fixed length feed amount with the work clamped by the front vice and not the rear vice.

3. The circular cutting machine according to claim 1, wherein the fixed length cutting controller is configured during execution of the work pullout process to perform the following:

actuating the transfer vice unit to clamp the work after moving forward of the standby position and moving to a forward end from that clamping position;

actuating the transfer vice unit, while currently in the forward end, to pass the work to the main vice unit while the transfer vice unit is clamping the work by causing the rear vice of the main vice unit to clamp the work;

actuating the front vice to unclamp the work and retract to the rearmost position; and then actuating the front vice alone to clamp the work in the rearmost position and advance the work the distance equivalent to the fixed length feed amount minus the foregoing forward movement of the transfer vice unit so as to carry out the pullout of the work.

4. The circular cutting machine according to claim 1, further comprising:

air nozzles provided in proximity to a cutting edge of the circular saw blade mounted on the circular saw motor, for discharging compressed air in the direction feeding the work so as to bend the entire circular saw blade in such a manner as to turn the cutting edge away from the remaining work; and wherein the processor is further configured to execute a saw blade return control process that configures the fixed length cutting controller to cause the transfer vice unit to clamp and retract the work when the headstock transfer unit retracts the circular saw motor from the cutting position to the standby position until the determination process determines that the remaining length of the work has become insufficient to permit the transfer vice unit to advance the work the fixed length feed amount, and after the determination process determines that the remaining length of the work has become insufficient to permit the transfer vice unit to advance the work the fixed length feed amount, the saw blade return control process causes the circular saw motor to start retraction after causing compressed air to be discharged from the air nozzles when the headstock transfer unit retracts the circular saw motor from the cutting position to the standby position, the saw blade return control process continuing to cause compressed air to be discharged from the air nozzles at least until after the cutting edge of the circular saw blade clears the cut surface of the work toward the standby position.

* * * * *